US010645741B2

(12) United States Patent
Wakabayashi et al.

(10) Patent No.: US 10,645,741 B2
(45) Date of Patent: *May 5, 2020

(54) COMMUNICATIONS SYSTEM, COMMUNICATIONS DEVICE AND METHOD

(71) Applicant: Sony Corporation, Tokyo (JP)

(72) Inventors: Hideji Wakabayashi, Basingstoke (GB); Brian Alexander Martin, Basingstoke (GB)

(73) Assignee: SONY CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/568,248

(22) Filed: Sep. 12, 2019

(65) Prior Publication Data

US 2020/0008253 A1 Jan. 2, 2020

Related U.S. Application Data

(63) Continuation of application No. 16/207,212, filed on Dec. 3, 2018, now Pat. No. 10,462,833, which is a (Continued)

(30) Foreign Application Priority Data

Sep. 12, 2014 (EP) ..................................... 14184600

(51) Int. Cl.
*H04W 76/14* (2018.01)
*H04W 4/70* (2018.01)
(Continued)

(52) U.S. Cl.
CPC ............. *H04W 76/14* (2018.02); *H04W 4/70* (2018.02); *H04W 8/005* (2013.01);
(Continued)

(58) Field of Classification Search
None
See application file for complete search history.

(56) References Cited

U.S. PATENT DOCUMENTS 9,826,522 B2 * 11/2017 Chen ..................... H04W 72/00
10,225,877 B2 * 3/2019 Wakabayashi ........ H04W 76/14
(Continued)

FOREIGN PATENT DOCUMENTS

| WO | 2012/159270 A1 | 11/2012 |
| WO | 2015/113690 A1 | 8/2015 |

(Continued)

OTHER PUBLICATIONS

Taiwanese Office Action dated Dec. 10, 2018, issued in corresponding Taiwanese Patent Application No. 104124259.
(Continued)

Primary Examiner — Raymond S Dean
(74) Attorney, Agent, or Firm — Xsensus LLP

(57) ABSTRACT

A method of allocating resources for communications in a mobile telecommunication system wherein the mobile telecommunication system provides a wireless interface for a base station to communicate with communications devices and wherein a communications device is operable to transmit signals to another communications device using resources of the wireless interface and in accordance with a device-to-device communication protocol. A first pool of the resources is allocated to device-to-device communications of the broadcast type and a second pool of the resources is allocated to a device-to-device communications of the unicast type, the second pool of resources being separate from the first pool. The method comprises a first communications device transmitting broadcast messages using resources of
(Continued)

the first resources pool and a second communications device transmitting unicast messages using resources of the second resources pool.

20 Claims, 14 Drawing Sheets

Related U.S. Application Data continuation of application No. 15/502,013, filed as application No. PCT/EP2015/070773 on Sep. 10, 2015, now Pat. No. 10,225,877.

(51) Int. Cl.

| | | |
|---|---|---|
| *H04W 76/11* | (2018.01) | |
| *H04W 8/00* | (2009.01) | |
| *H04W 28/02* | (2009.01) | |
| *H04W 72/04* | (2009.01) | |
| *H04W 88/02* | (2009.01) | |
| *H04W 92/18* | (2009.01) | |

(52) U.S. Cl.
CPC ..... *H04W 28/021* (2013.01); *H04W 72/0406* (2013.01); *H04W 76/11* (2018.02); *H04W 88/02* (2013.01); *H04W 92/18* (2013.01); *H04W 72/04* (2013.01)

(56) References Cited

U.S. PATENT DOCUMENTS

| | | | |
|---|---|---|---|
| 2008/0304448 A1 | 12/2008 | Hosein | |
| 2009/0011770 A1 | 1/2009 | Jung et al. | |
| 2012/0300662 A1 | 11/2012 | Wang et al. | |
| 2013/0170387 A1 | 7/2013 | Wang et al. | |
| 2013/0176952 A1 | 7/2013 | Shin et al. | |
| 2014/0073337 A1 | 3/2014 | Hong et al. | |
| 2014/0094183 A1 | 4/2014 | Gao et al. | |
| 2014/0256369 A1 | 9/2014 | Ji et al. | |
| 2015/0215903 A1* | 7/2015 | Zhao | H04W 72/04 370/329 |
| 2016/0044721 A1 | 2/2016 | Mhatre et al. | |
| 2017/0142741 A1* | 5/2017 | Kaur | H04W 56/002 |
| 2017/0171874 A1* | 6/2017 | Kim | H04W 28/02 |
| 2017/0188261 A1 | 6/2017 | Harada et al. | |
| 2017/0223719 A1* | 8/2017 | Huang | H04L 5/0057 |
| 2017/0230957 A1 | 8/2017 | Wakabayashi et al. | |
| 2019/0104558 A1* | 4/2019 | Wakabayashi | H04W 76/14 |

FOREIGN PATENT DOCUMENTS

| | | |
|---|---|---|
| WO | 2015/113696 A1 | 8/2015 |
| WO | 2015/113719 A1 | 8/2015 |
| WO | 2015/113720 A1 | 8/2015 |

OTHER PUBLICATIONS

Office Action issued for European Application 15760479.4-1215, dated Jul. 20, 2018.
R2-133840, "CSMA/CA based resource selection," Samsung, 3GPP TSG-RAN WG2 #84, Nov. 11-15, 2013, 4 pages.
R2-133990, "Network control for Public Safety D2D Communications", Orange, Fluawei, HiSilicon, Telecom Italia, 3GPP TSG-RAN WG2 No. 84, Nov. 11-15, 2013, 5 pages.
R2-134246, "The Synchronizing Central Node for Out of Coverage D2D Communication", General Dynamics Broadband UK, 3GPP TSG-RAN2 No. 84, Nov. 11-15, 2013, 3 pages.
R2-134426, "Medium Access for D2D communication", LG Electronics Inc., 3GPP TSG-RAN WG2 #84, Nov. 11-15, 2013, 8 pages.
R2-134238, "D2D Scheduling Procedure", Ericsson, 3GPP TSG-RAN WG2 No. 84, Nov. 11-15, 2013, 7 pages.
R2-134248, "Possible mechanisms for resource selection in connectionless D2D voice communication", General Dynamics Broadband UK, 3GPP TSG-RAN2 No. 84, Nov. 11-15, 2013, 9 pages.
R2-134431, "Simulation results for D2D voice services using connectionless approach", General Dynamics Broadband UK, 3GPP TSG-RAN2 #84, Nov. 11-15, 2013, 6 pages.
Sang et al., "D2D Resource Allocation under the Control of BS", University of Electronic Science and Technology AS of China, https://mentor.ieee.org/802.16/dcn/13/16-13-0123-02-000n-d2d-resource-allocation-under-the-control-of-bs.docx, 2016, 7 pages.
Holma, et al., "LTE for UMTS: OFDMA and SC-FDMA Based Radio Access," Wiley 2009, ISBN 978-0-470-99401-6, 4 pages.
3GPP TR 23.703 V12.0.0, "3rd Generation Partnership Project; Technical Specification Group Services and System Aspects; Study on architecture enhancements to support Proximity-based Services (ProSe) (Release 12)," Feb. 2014, 324 pages.
3GPP TR 36.843 V12.0.0, "3rd Generation Partnership Project; Technical Specification Group Services and System Aspects; Study on Core Network Overload (CNO) solutions (Release 12)," Dec. 2013, 48 pages.
RP-140648, "Status Report to TSG Agenda item: 11.7.15, Acronym LTE_D2D_Prox," Qualcomm Incorporated, 3GPP TSG RAN meeting #64, Jun. 10-13, 2014, 25 pages.
International Search Report dated Dec. 4, 2015 for PCT/EP2015/070773, filed Sep. 10, 2015.

* cited by examiner

COMMUNICATIONS SYSTEM, COMMUNICATIONS DEVICE AND METHOD

CROSS-REFERENCE TO RELATED APPLICATIONS

This application is a continuation of U.S. application Ser. No. 16/207,212, filed Dec. 3, 2018, which is a continuation of U.S. application Ser. No. 15/502,013, filed Feb. 6, 2017 (now U.S. Pat. No. 10,225,877), which is based on PCT filing PCT/EP2015/070773, filed Sep. 10, 2015, which claims priority to EP 14184600.6, filed Sep. 12, 2014, the entire contents of each are incorporated herein by reference.

TECHNICAL FIELD OF THE DISCLOSURE

The present disclosure relates to communications systems for device-to-device communication, communications devices for device-to-device communication and methods of allocating resources.

BACKGROUND OF THE DISCLOSURE

Mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as video streaming and video conferencing on mobile communications devices that would previously only have been available via a fixed line data connection.

The demand to deploy fourth generation networks is therefore strong and the coverage area of these networks, i.e. geographic locations where access to the networks is possible, is expected to increase rapidly. However, although the coverage and capacity of fourth generation networks is expected to significantly exceed those of previous generations of communications networks, there are still limitations on network capacity and the geographical areas that can be served by such networks. These limitations may, for example, be particularly relevant in situations in which networks are experiencing high load and high-data rate communications between communications devices, or when communications between communications devices are required but the communications devices may not be within the coverage area of a network. In order to address these limitations, in LTE release-12 the ability for LTE communications devices to perform device-to-device (D2D) communications will be introduced.

D2D communications allow communications devices that are in close proximity to directly communicate with each other, both when within and when outside of a coverage area or when the network fails. This D2D communications ability can allow user data to be more efficiently communicated between communications devices by obviating the need for user data to be relayed by a network entity such as a base station, and also allows communications devices that are in close proximity to communicate with one another although they may not be within the coverage area of a network. The ability for communications devices to operate both inside and outside of coverage areas makes LTE systems that incorporate D2D capabilities well suited to applications such as public safety communications, for example. Public safety communications require a high degree of robustness whereby devices can continue to communicate with one another in congested networks and when outside a coverage area.

Fourth generation networks have therefore been proposed as a cost effective solution to public safety communications compared to dedicated systems such as TETRA, which are currently used throughout the world. However the requirements and expectations for public safety communications can differ from those for conventional LTE communications. In particular, the technical constraints of public safety D2D communications can thus create challenges for other D2D communications, for example for non-public safety communications. In particular, D2D communications are well suited for direct one-to-many (broadcast) communications but not well suited to one-to-one (unicast) communications.

SUMMARY OF THE DISCLOSURE

According to a first aspect of the invention, there is provided a method of allocating resources for communications in a mobile telecommunication system wherein the mobile telecommunication system provides a wireless interface for a base station to communicate with communications devices and wherein a communications device is operable to transmit signals to another communications device using resources of the wireless interface and in accordance with a device-to-device communication protocol. A first pool of the resources is allocated to device-to-device communications of the broadcast type and a second pool of the resources is allocated to a device-to-device communications of the unicast type, the second pool of resources being separate from the first pool. The method comprises a first communications device transmitting broadcast messages using resources of the first resources pool; and a second communications device transmitting unicast messages using resources of the second resources pool. In other words, there is provided a method which comprises transmitting broadcast device-to-device messages using resources of a resources pool and transmitting unicast device-to-device messages using resources of a different resources pool.

According to another aspect of the present invention there is provided a mobile telecommunication system for device-to-device communication. The mobile telecommunication system comprises a base station; and communications devices. The mobile telecommunication system provides a wireless interface for the base station to communicate with the communications devices. One of the communications devices is operable to transmit signals to another one of the communications devices using resources of the wireless interface and in accordance with a device-to-device communication protocol. A first pool of the resources is allocated to device-to-device communications of the broadcast type and a second pool of the resources is allocated to a device-to-device communications of the unicast type, the second pool of resources being separate from the first pool. A first of the communications devices is configured to transmit broadcast messages using resources of the first resources pool; and a second of the communications devices is configured to transmit unicast messages using resources of the second resources pool.

According to a further aspect of the present invention, there is provided a communications device for device-to-device communication, wherein the communication device is configured to operate in a mobile telecommunication system, the mobile telecommunication system providing a wireless interface for a base station to communicate with communications devices. The communications device is operable to transmit signals to another communications device using resources of the wireless interface and in accordance with a device-to-device communication protocol. The communications device being operable to transmit signals in accordance with a device-to-device communication protocol comprises the communications device being operable to transmit broadcast messages using resources of a first pool of resources; and the communications device being operable to transmit unicast messages using resources of a second pool of resources, the second pool of resources being separate from the first pool of resources.

Various further aspects and features of the present disclosure are defined in the appended claims and include a communications device, a method of communicating using a communications device.

BRIEF DESCRIPTION OF DRAWINGS

Embodiments of the present disclosure will now be described by way of example only with reference to the accompanying drawings wherein like parts are provided with corresponding reference numerals and in which.

DESCRIPTION OF EXAMPLE EMBODIMENTS

Figure 1:
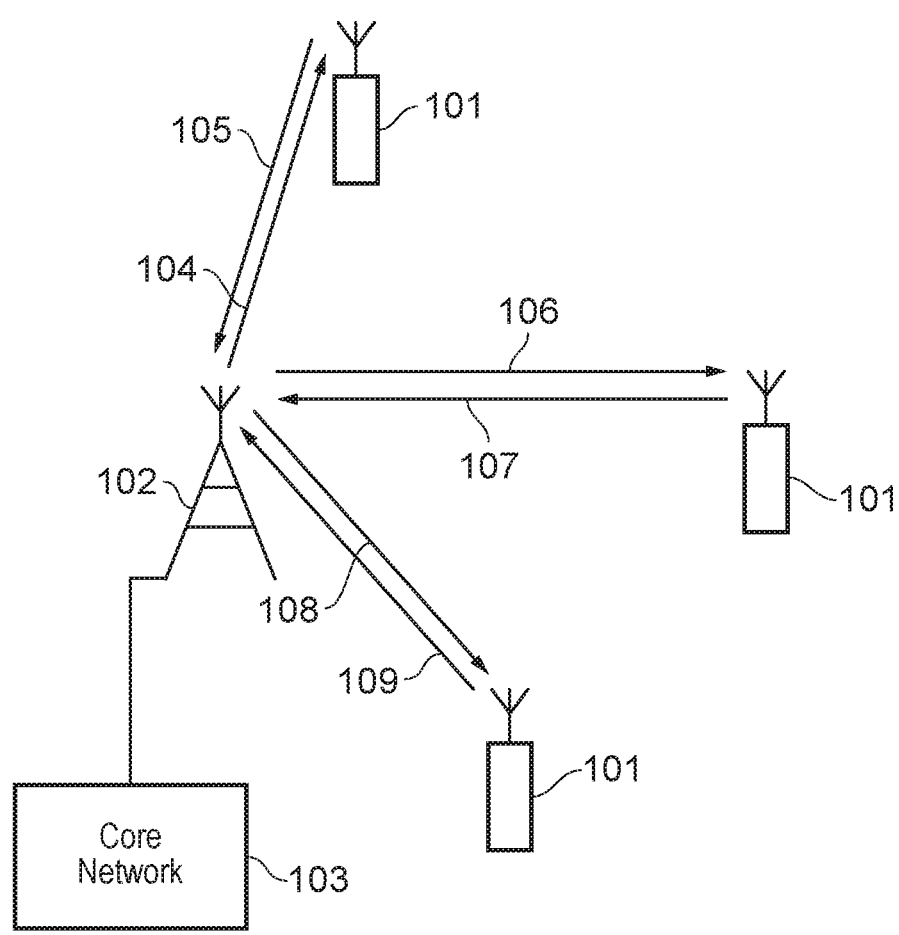
FIG. 1 provides a schematic diagram of a mobile communications system.

FIG. 1 provides a schematic diagram of a conventional mobile telecommunications system 100, where the system includes mobile communications devices 101, infrastructure equipment 102 and a core network 103. The infrastructure equipment may also be referred to as a base station, network element, enhanced Node B (eNodeB or eNB) or a coordinating entity for example, and provides a wireless access interface to the one or more communications devices within a coverage area or cell. The one or more mobile communications devices may communicate data via the transmission and reception of signals representing data using the wireless access interface. The network entity 102 is communicatively linked to the core network 103 where the core network may be connected to one or more other communications systems or networks which have a similar structure to that formed from communications devices 101 and infrastructure equipment 102. The core network may also provide functionality including authentication, mobility management, charging and so on for the communications devices served by the network entity. The mobile communications devices of FIG. 1 may also be referred to as communications terminals, user equipment (UE), terminal devices and so forth, and are configured to communicate with at least one or more other communications devices served by the same or a different coverage area via the network entity. These communications may be performed by transmitting and receiving signals representing data using the wireless access interface over the two way communications links represented by lines 104 to 109, where 104, 106 and 108 represent downlink communications from the network entity to the communications devices and 105, 107 and 109 represent the uplink communications from the communications devices to the network entity. The communications system 100 may operate in accordance with any known protocol, for instance in some examples the system 100 may operate in accordance with the 3GPP Long Term Evolution (LTE) standard where the network entity and communications devices are commonly referred to as eNodeB and UEs, respectively.

Figure 2:
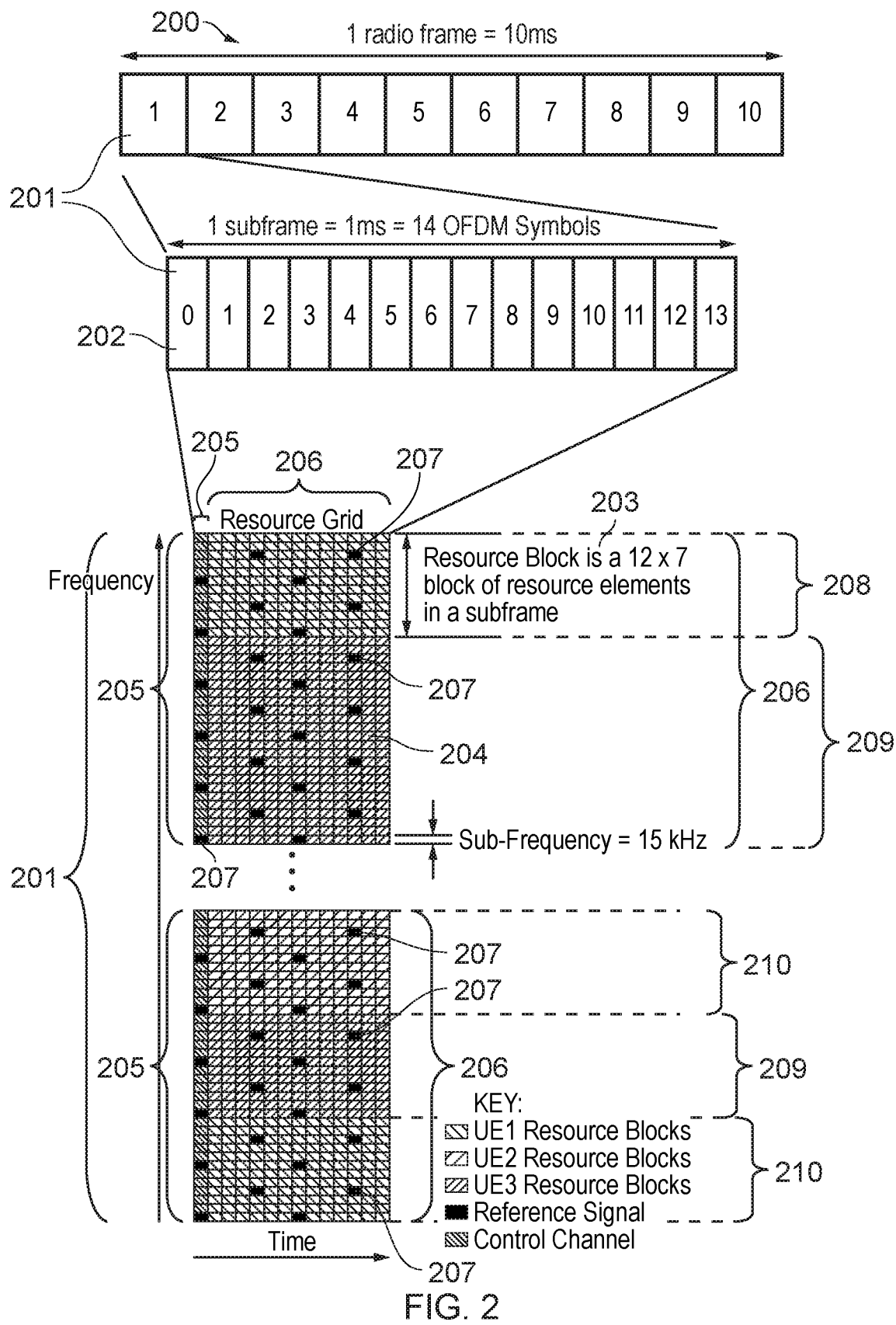
FIG. 2 provides a schematic diagram of the structure of a downlink of a wireless access interface of a mobile communications system.

FIG. 2 provides a simplified schematic diagram of the structure of a downlink of a wireless access interface that may be provided by or in association with the eNodeB of FIG. 1 when the communications system is operating in accordance with the LTE standard. In LTE systems the wireless access interface of the downlink from an eNodeB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.25 MHZ and 20 MHz bandwidth may be divided into 128 to 2048 orthogonal subcarriers for example. Each subcarrier bandwidth may take any value but in LTE it is fixed at 15 KHz. As shown in FIG. 2, the resources of the wireless access interface are also temporally divided into frames where a frame 200 lasts 10 ms and is subdivided into 10 subframes 201 each with a duration of 1 ms. Each subframe is formed from 14 OFDM symbols and is divided into two slots each of which comprise six or seven OFDM symbols depending on whether a normal or extended cyclic prefix is being utilised between OFDM symbols for the reduction of intersymbol interference. The resources within a slot may be divided into resources blocks 203 each comprising 12 sub-carriers for the duration of one slot and the resources blocks further divided into resource elements 204 which span one subcarrier for one OFDM symbol, where each rectangle 204 represents a resource element.

In the simplified structure of the downlink of an LTE wireless access interface of FIG. 2, each subframe 201 comprises a control region 205 for the transmission of control data, a data region 206 for the transmission of user data, reference signals 207 and synchronisation signals which are interspersed in the control and data regions in accordance with a predetermined pattern. The control region 205 may contain a number of physical channels for the transmission of control data, such as a physical downlink control channel (PDCCH), a physical control format indicator channel (PCFICH) and a physical HARQ indicator channel (PHICH). The data region 206 may contain a number of physical channel for the transmission of data, such as a physical downlink shared channel (PDSCH) and a physical broadcast channels (PBCH). Although these physical channels provide a wide range of functionality to LTE systems, in terms of resource allocation and the present disclosure PDCCH and PDSCH are most relevant. Further information on the structure and functioning of the physical channels of LTE systems can be found in [11].

Resources within the PDSCH may be allocated by an eNodeB to UEs being served by the eNodeB. For example, a number of resource blocks of the PDSCH may be allocated to a UE in order that it may receive data that it has previously requested or data which is being pushed to it by the eNodeB, such as radio resource control (RRC) signalling. In FIG. 2, UE1 has been allocated resources 208 of the data region 206, UE2 resources 209 and UE resources 210. UEs in a an LTE system may be allocated a fraction of the available resources of the PDSCH and therefore UEs are required to be informed of the location of their allocated resources within the PDCSH so that only relevant data within the PDSCH is detected and estimated. In order to inform the UEs of the location of their allocated communications resources, resource control information specifying downlink resource allocations is conveyed across the PDCCH in a form termed downlink control information (DCI), where resource allocations for a PDSCH are communicated in a preceding PDCCH instance in the same subframe. During a resource allocation procedure, UEs thus monitor the PDCCH for DCI addressed to them and once such a DCI is detected, receive the DCI and detect and estimate the data from the relevant part of the PDSCH.

Figure 3:
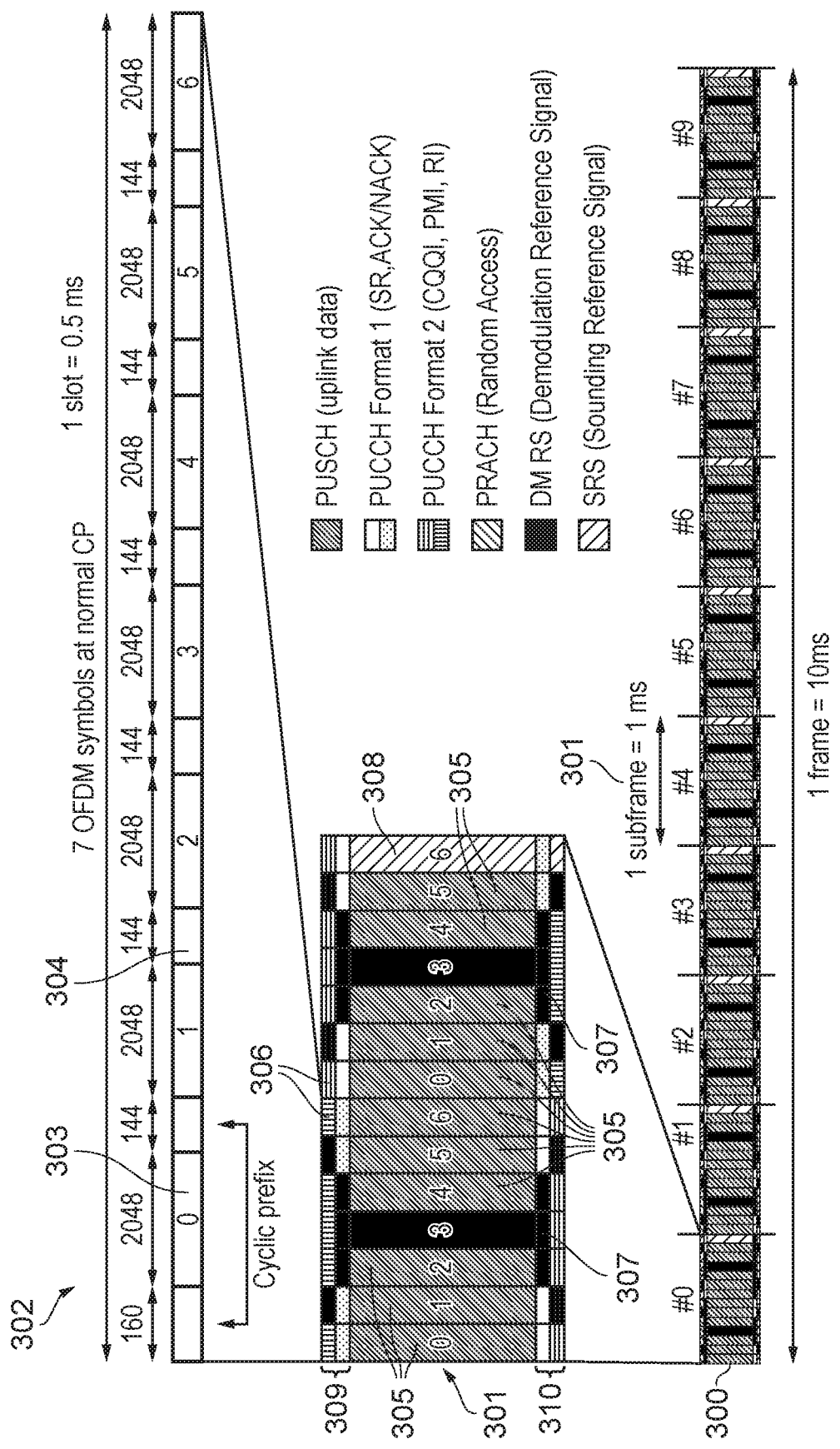
FIG. 3 provides a schematic diagram of an uplink of a wireless access interface of a mobile communications system.

FIG. 3 provides a simplified schematic diagram of the structure of an uplink of an LTE wireless access interface that may be provided by or in association with the eNodeB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an FDD implementation. A frame 300 is divided in to 10 subframes 301 of 1 ms duration where each subframe 301 comprises two slots 302 of 0.5 ms duration. Each slot is then formed from seven OFDM symbols 303 where a cyclic prefix 304 is inserted between each symbol in a manner equivalent to that in downlink subframes. In FIG. 3 a normal cyclic prefix is used and therefore there are seven OFDM symbols within a subframe, however, if an extended cyclic prefix were to be used, each slot would contain only six OFDM symbols. The resources of the uplink subframes are also divided into resource blocks and resource elements in a similar manner to downlink subframes.

Each uplink subframe may include a plurality of different channels, for example a physical uplink shared channel (PUSCH) 305, a physical uplink control channel (PUCCH) 306, and a physical random access channel (PRACH). The physical Uplink Control Channel (PUCCH) may carry control information such as ACK/NACK to the eNodeB for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink subframes may also include reference signals. For example, demodulation reference signals (DMRS) 307 and sounding reference signals (SRS) 308 may be present in an uplink subframe where the DMRS occupy the fourth symbol of a slot in which PUSCH is transmitted and are used for decoding of PUCCH and PUSCH data, and where SRS are used for uplink channel estimation at the eNodeB. Further information on the structure and functioning of the physical channels of LTE systems can be found in [1].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNodeB. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information (UCI) on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink subframes, uplink subframes have a different control structure to downlink subframes, in particular the upper 309 and lower 310 subcarriers/frequencies/resource blocks of an uplink subframe are reserved for control signalling rather than the initial symbols of a downlink subframe. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulation in combination and therefore if efficient use of the available resources are to be made contiguous frequency allocations for each UE are preferable.

As a result of the above described wireless interface structure and operation, one or more UEs may communicate data to one another via a coordinating eNodeB, thus forming a conventional cellular telecommunications system. Although cellular communications system such as those based on the previously released LTE standards have been commercially successful, a number of disadvantages are associated with such centralised systems. For example, if two UEs which are in close proximity wish to communicate with each other, uplink and downlink resources sufficient to convey the data are required. Consequently, two portions of the system's resources are being used to convey a single portion of data. A second disadvantage is that an eNodeB is required if UEs, even when in close proximity, wish to communicate with one another. These limitations may be problematic when the system is experiencing high load or eNodeB coverage is not available, for instance in remote areas or when eNodeBs are not functioning correctly. Overcoming these limitations may increase both the capacity and efficiency of LTE networks but also lead to the creations of new revenue possibilities for LTE network operators.

Device-to-Device Communications

D2D communications offer the possibility to address the aforementioned problems of network capacity and the requirement of network coverage for communications between LTE devices. For example, if user data can be communicated directly between UEs only one set of resources is required to communicate the data rather than both uplink and downlink resources. Furthermore, if UEs are capable of communicating directly, UEs within range of each other may communicate even when outside of a coverage area provided an eNodeB. As a result of these potential benefits, the introduction of D2D capabilities into LTE systems has been proposed.

Figure 4:
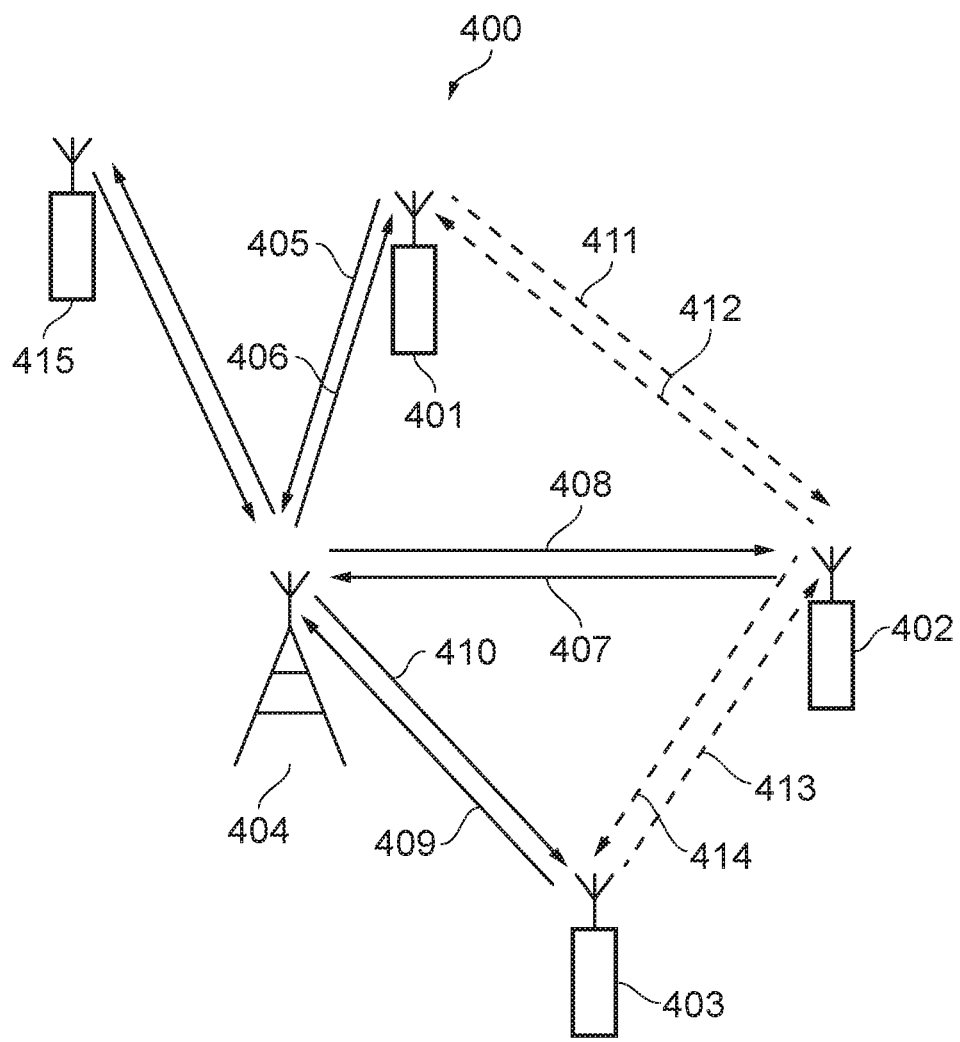
FIG. 4 provides a schematic diagram of a mobile communications system in which communications devices can perform device-to-device communications.

FIG. 4 provides a schematic diagram of a mobile communications system 400 that is substantially similar to that described with reference to FIG. 1 but where the UEs 401 402 403 are also operable to perform direct device-to-device (D2D) communications with one another. D2D communications comprise UEs directly communicating data between one another without user and or control data being communicated via a dedicated coordinating entity such as an eNodeB. For example, in FIG. 4 communications between the UEs 401 402 403 415 and the eNodeB 404 are in accordance with the existing LTE standard, but as well as communicating via the uplink and downlinks 405 to 410, when the UEs 401 to 403 are within range of each other they may also communicate directly with one another via the D2D communication links 411 to 414. In FIG. 4 D2D communications links are indicated by dashed lines and are shown to exist between 401 and 402, and 402 and 403 but not between 401 and 403 because these UEs are not sufficiently close together to directly transmit and receive signals to and from one another. D2D communications links are also shown not to exist between 415 and other UEs because UE 415 is not capable of D2D communications. A situation such as that illustrated in FIG. 4 may exist in an LTE network where UE 415 is a device not compliant with the specifications for D2D operation. It has previously been proposed to provide some arrangement for device to device communication within standards which define communications systems according to specifications administered by the 3GPP referred to as Long Term Evolution (LTE). A number of possible approaches to the implementation of LTE D2D communications exist. For example, the wireless access interface provided for communications between UEs and eNodeB may be used for D2D communications, where an eNodeB allocates the required resources and control signalling is communicated via the eNodeB but user data is transmitted directly between UEs.

The wireless access interface utilised for D2D communications may be provided in accordance with any of a number of techniques, such as carrier sense multiple access (CSMA), OFDM or a combination thereof for example as well as an OFDM/SC-FDMA 3GPP LTE based wireless access interface. For example it has been proposed in document R2-133840 [1] to use a Carrier Sensed Multiple Access, CSMA, co-ordinations of transmission by UEs, which is un-coordinated/contention based scheduling by each UE. Each UE first listens then transmits on an unused resource.

In another example, UEs may communicate with each other by negotiating access to a wireless access interface directly, thus overcoming the need for a coordinating eNodeB. Examples of previously proposed arrangements include those in which one of the UEs of the group acts as a controlling entity to co-ordinate the transmissions of the other members of the group. Examples of such proposals are provided in the following documents:

[2] R2-133990, Network control for Public Safety D2D Communications; Orange, Huawei, HiSilicon, Telecom Italia

[3] R2-134246, The Synchronizing Central Node for Out of Coverage D2D Communication; General Dynamics Broadband UK

[4] R2-134426, Medium Access for D2D communication; LG Electronics Inc

In another arrangement one of the UEs of the group first sends a scheduling assignment, and then transmits data without a central scheduling UE or controlling entity controlling the transmissions. The following documents provide examples of this de-centralised arrangement:

[5] R2-134238, D2D Scheduling Procedure; Ericsson;

[6] R2-134248, Possible mechanisms for resource selection in connectionless D2D voice communication; General Dynamics Broadband UK;

[7] R2-134431, Simulation results for D2D voice services using connectionless approach; General Dynamics Broadband UK In particular, the last two contributions listed above, R2-134248 [6], R2-134431 [7], discuss the use of a scheduling channel, used by UEs to indicate their intention to schedule data along with the resources that will be used. The other document, R2-134238 [5], does not use a scheduling channel as such, but deploys at least some predefined resources to send the scheduling assignments.

Other example arrangements discussed in [8] and [9] require a base station to provide feedback to the communications devices to control their transmissions. Document [10] discusses an arrangement in which a dedicated resource exchanging channel is provided between cellular user equipment and device-to-device user equipment for interference control and resource coordination.

Figure 5A:
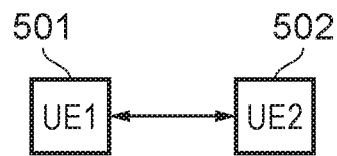
FIGS. 5a to 5d provides schematics diagrams of example device-to-device communications scenarios.
Figure 5B:
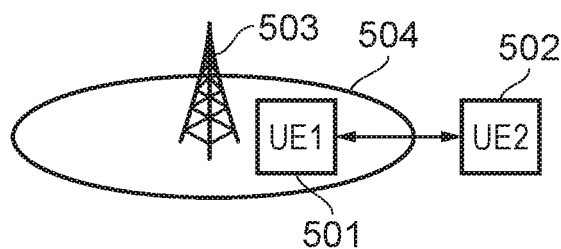
Figure 5C:
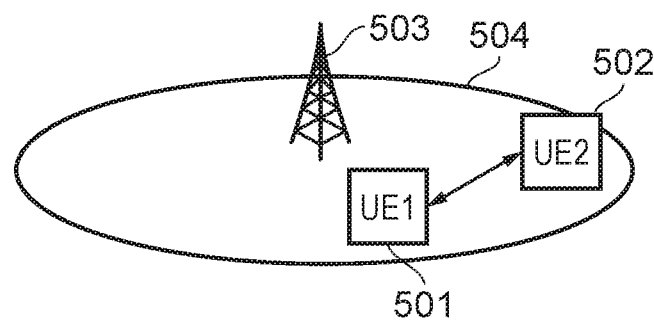
Figure 5D:
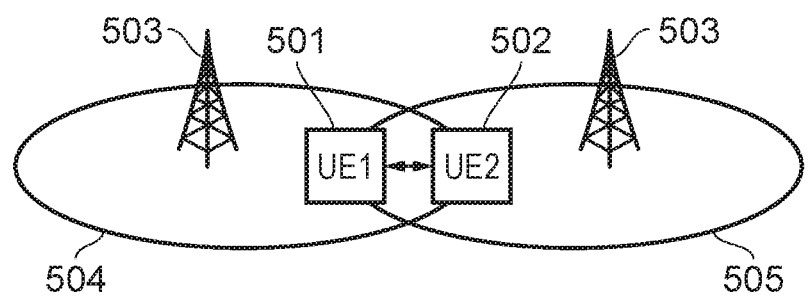

As a result of the possible approaches to the organisation of a D2D devices and networks, a number of scenarios may arise. A selection of example scenarios is provided by FIGS. 5a to 5d. In FIG. 5a UEs 501 and 502 are outside of a coverage area of an eNodeB. Such a scenario may occur in public safety communications for example, where either the UEs are outside of a coverage area or where the relevant mobile communications network is not currently functioning correctly. In FIG. 5b UE 501 is within a coverage area 504 of an eNodeB 503 and is performing D2D communications with UE 502 which is outside the coverage area 503. In FIG. 5c both UE 501 and 502 are within the coverage area of the eNodeB 503. In FIG. 5d a fourth more complex D2D scenario is illustrated, where UE 501 and UE 502 are each within the coverage areas 504 505 of different eNodeBs 503 and 504 respectively. FIGS. 5a to 5d illustrates just four of a large number of possible D2D usage scenarios, where further scenarios may be formed from combinations of those illustrated in FIGS. 5a to 5d. For example, two UEs communicating as shown in FIG. 5a may move into the usage scenario of FIG. 5d such that there are two groups of UEs performing D2D communications in the coverage areas of two eNodeBs.

Co-pending EP patent application EP14153512.0 discusses an arrangement in which communications devices which are configured to perform D2D communications, the contents of which are incorporated herein by reference. The communications devices are arranged to reserve shared communications resources, such as those of the PUSCH of an LTE Up-link, by transmitting a scheduling assignment messages in a predetermined section of resources, referred to as a scheduling assignment region, allocated for performing contentious access. As discusses in EP14153530.2, the contents of which are incorporated herein by reference, a contention resolution procedure is adopted by the communications devices so that if one or more communications devices transmit scheduling assignment messages contemporaneously in the same section of the scheduling assignment region then the communications devices can detect the contentious access and re-try at a different time.

Figure 6:
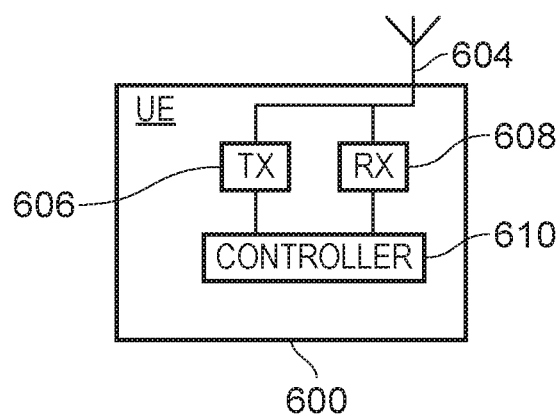
FIG. 6 provides a schematic illustration of a UE.

FIG. 6 illustrate a simplified structure of a UE for use in accordance with the teachings of the present disclosure. The UE 600 include an antenna 604 for sending and receiving wireless signals, a transmitter ("TX") 606 for sending signals via the antenna 604 and a receiver ("RX") 608 for receiving signals via the antenna. In other words, the UE 600 is configured to communicate via a wireless interface. The controller 610 can control messages sent and received, for example by generating messages to be sent or by decoding received messages. The UE 600 illustrated in FIG. 6 is representative of a typical UE in an LTE environment. However other UEs may be suitable for use with the present invention. For example, the same or similar UEs can sometimes be represented with a transceiver in place of the TX and RX pair. Such UEs are also considered as suitable for use in accordance with the teachings of the present disclosure.

Resources Allocation

Conventionally, UEs operating in a D2D mode will share a frequency band and will use the resources in that band in an opportunistic manner. D2D UEs may also operate in a mode where resources are controlled by the eNodeB, however the main use case in D2D is one where the UEs try to use the shared resources opportunistically. However, due to the nature of a shared resources environment, the risk of collisions between messages sent by different UEs is high when the UEs use resources in an opportunistic manner. In the situation where the eNodeB may not be able to allocate resources for D2D communications, the conventional D2D systems can therefore be unsuitable for high reliability communications.

Additionally, D2D has been designed for use by public safety systems where a UE is expected to communicate messages to several UEs in the same group. In other words, a D2D UE is expected to send mostly broadcast messages (which can mean sometimes denoted as 1:M messages) and the D2D communications protocols have been designed with this main use case in mind. Even though unicast messages may be sent in such a D2D system originally designed for 1:M messaging (for example by having M=1), this system can be poorly adapted to 1:1 messaging. For example, the addressing system is limited by the number of possible addresses (e.g. 256 group IDs in LTE D2D). Also, the call flows and signalling for 1:M communications and for 1:1 communications can sometimes be very different. For example, 1:M communications can be more likely to be associated with a best effort mode while 1:1 communications can be more likely to require a higher reliability, lower latency, a higher prioritisation and/or a higher QoS. As a result, sharing resources on a frequency band or channel designed to be used for, and used for, 1:M communications can be detrimental to 1:1 communications and in particular to the resulting quality of service for 1:1 communications.

It would thus be desirable to have an arrangement where 1:1 D2D communications would be facilitated. It would also be desirable to have an arrangement high reliability 1:1 D2D communications would be facilitated.

Resources Allocation—Shared Pool

In accordance with the present disclosure, there is provided an arrangement where shared D2D resources for 1:M communications are separated from resources for 1:1 communications. The resources, or group of resources, allocated to one of 1:M and 1:1 communications we be referred to as one as a resource pool. Accordingly, the use of resources in the 1:1 resources pool may be adapted to be better suited to 1:1 communications and/or may thereby be made more reliable by reducing the risk of collisions between D2D signals, in particular between D2D 1:1 and 1:M communication signals. This advantageous arrangement will now be discussed using the illustrations of FIGS. 7A to 7C as examples of possible implementations and embodiments.

Figure 7A:
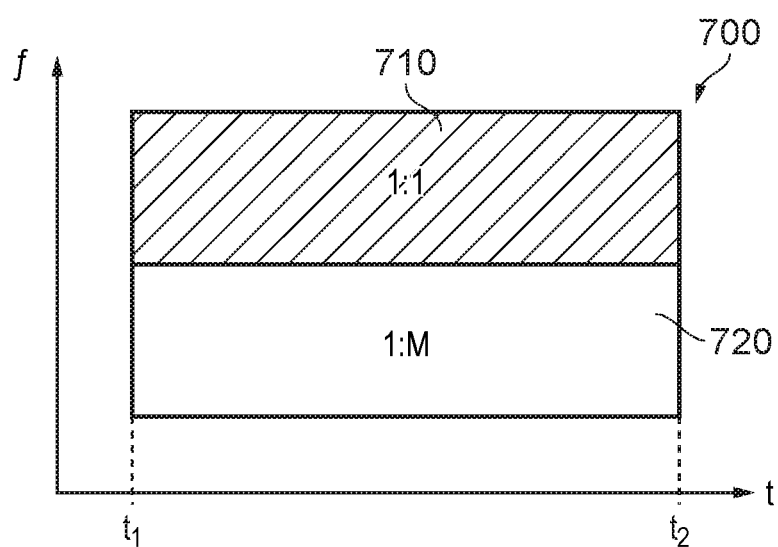
FIGS. 7A-7C provide an illustration of an example of resources pool allocation in accordance with the present disclosure.

FIG. 7A provides a first illustration of an example of resources pool allocation in accordance with the present disclosure. In this example, allocations within a frequency band f1-f2 during a time period t1-t2 is being considered. The resources 700 available for this frequency band and for this time period are divided between two resources pool. The first resources pool 710 is allocated to 1:1 D2D communications while the second resources pool 720 is allocated to 1:M D2D communications. Although in this example only one frequency sub-band is allocated to the 1:1 resources pool and one frequency sub band is allocated to the 1:M resources pool, in other examples, a plurality of frequency sub-bands may be allocated to one or both of the 1:1 and 1:M resources pools.

Accordingly D2D communications on a shared frequency band may be allocated resources based on whether the communications are broadcast or unicast communications. In some examples, when no unicast communications are expected to take place on the shared band, all of the resources 700 may be allocated to the 1:M resources pool 720 and no resources may be allocated to the 1:1 resources pool 710. In this case, conventional 1:M D2D communications can advantageously use all of the resources 700 and thus use more resources than available in resources pool 720 in the example illustrated in FIG. 7A. Also, if necessary, variations could be made to the communications protocols and/or methods of communicating on the 1:1 resources pool which may make the use of the resources pool more adapted to unicast communications.

In the example of FIG. 7A, the resources have been divided between 1:M and 1:1 communications resources pools on a frequency only basis but in other examples the resources may be allocated to the two resources pools based on alternative and/or additional criteria.

Figure 7B:
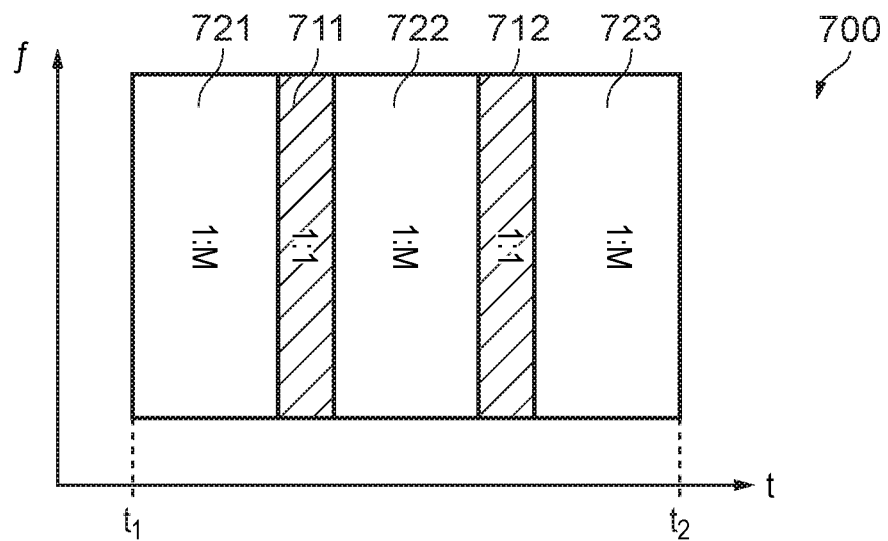

For example, FIG. 7B provides a second illustration of an example of resources pool allocation in accordance with the present disclosure. In the example of FIG. 7B, the resources are being divided between 1:M and 1:1 communications resources pool on a time only basis. During the time period t1-t2, the resources 700 are being allocated across the band to 1:M communications during three separate time sub-periods 721, 722 and 723. On the other hand, doing the same time period, the resources 700 are being allocated across the band as well to 1:1 communications during two separate time sub-periods 711 and 712. As for the example of FIG. 7A, separate resources pools are dedicated to unicast and to multicast communications thereby reducing the risk of collisions between the two types of communications and enabling the tailoring of communications to unicast or magic as communications, if needed.

Figure 7C:
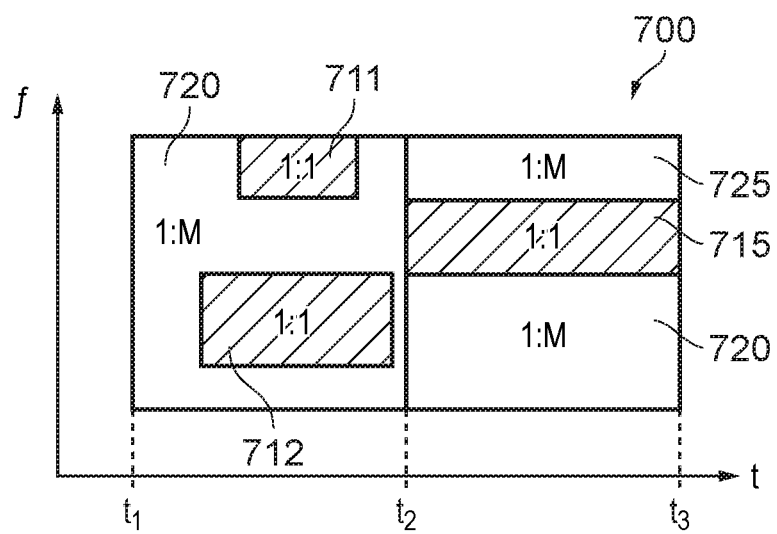

The examples of FIGS. 7A and 7B illustrates two simple ways of allocating resources to the 1:1 and 1:M resources pools. However, any other suitable ways of allocating resources may be used at point in time and may be changed at a different point in time if appropriate. For example, FIG. 7C provides a third illustration of an example of resources pool allocation in accordance with the present disclosure. In this example, a frequency band is considered during a time period t1-t3. As a point in time t2 between t1 and t3, the respective resources allocations for the 1:1 and 1:M communications pools are changed. In some examples, such a change may occur on a periodical basis (for example every subframe, frame, n subframes and/or n frames with n≥2), on an event-triggered basis, on a user request basis, on a network request basis, on any other suitable basis and/or on any combination thereof. In the illustration of FIG. 7C, between t1 and t2, the resources pools are allocated resources on a time and frequency basis with blocks 711 and 712 allocated to 1:1 resources pool and the remainder of the resources for that period allocated to 1:M resources pool. On the other hand, between t2 and t3, the resources pools allocated resources on a frequency-only basis. A first frequency band 715 within f1 and f2 is allocated to the 1:1 resources pool while two separate frequency bands 725 and 726 are allocated to the 1:M resources pool.

Depending on an expected or anticipated level of 1:1 communications, the relative sizes of the 1:1 resources pool and 1:M resources pool may be adjusted to better suit the anticipated need for resources for unicast and multicast D2D communications. For example, all of the resources available for D2D communications may be allocated to 1:M communications by default and in the event that 1:1 communications are expected, additional resources may be allocated for D2D 1:1 communications and/or resources previously allocated to the 1:M resources pool may now be allocated to the 1:1 resources pool. The decision to change the size or sizes of any of the resources pools may be made by any suitable element of the mobile communication system, such as a UE or an eNodeB. The communication of the resources distribution between 1:M and 1:1 resources pools is further discussed below at least in respect of FIGS. 15 to 17. In some examples, UEs may be required to communicate an advance warning that they intend to use 1:1 communications and these advance warning messages may be used for the purpose of sizing one or more resources pools (or allocating resources from a resource pool to 1:1 communications). This may involve a UE sending broadcast message using 1:M resources for sending a warning and then using 1:1 resources for its 1:1 communications.

Figure 8:
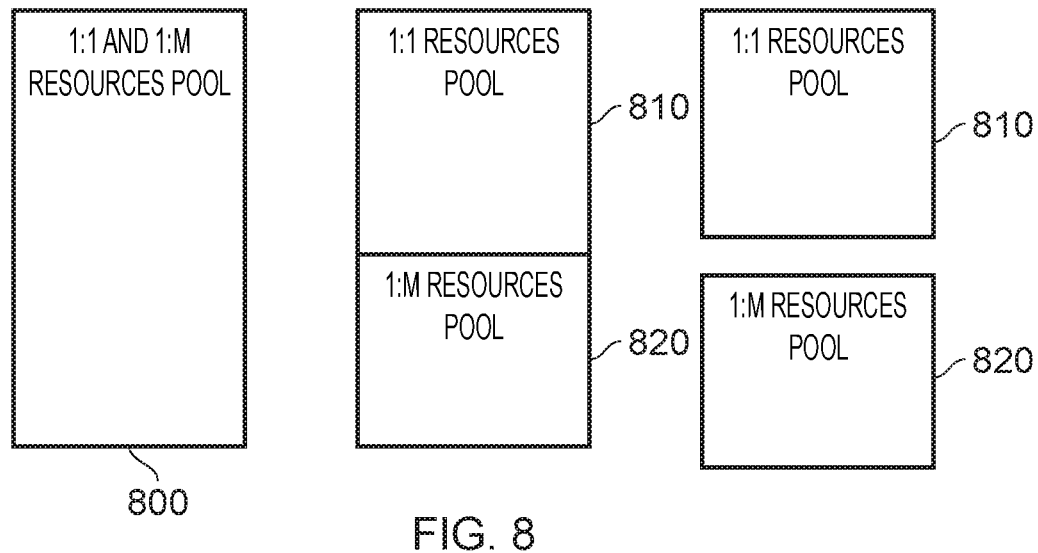
FIG. 8 provides examples of an example of resources pool illustrations in accordance with the present disclosure.

As mentioned above, the resources pools may have any appropriate distribution within the available resources and this distribution may change with time. In the remainder of the present disclosure, the resources pool will be illustrated in simplified manner as illustrated for example in FIG. 8, which provides examples of an example of resources pool illustrations in accordance with the present disclosure. The three illustrations of FIG. 8 are logical illustrations and represents three different possible views of one and the same 1:1 and 1:M resources pools allocation or distribution. The 1:1 resources pool is denoted as 810, the 1:M resources pool as 820 and the overall (1:1 and 1:M) D2D resources pool is denoted as 800. In the first view, the D2D pool 800 is illustrated as a single pool, without differentiating 1:1 from 1:M resources. This is not necessarily indicative of the presence of—or of the absence of—separate pools for 1:1 and 1:M D2D communications. In the second view, where separate 1:1 and 1:M pools are provided, the pools are illustrated as adjacent groups of resources. Again, this illustration is only logical and the corresponding resources may in fact be physically non-adjacent (e.g. in time and/or frequency)—or may be adjacent. Likewise, in the third view, the resources pools are represented as non-adjacent pools, however the corresponding resources may be physically adjacent (e.g. in time and/or frequency)—or may not be adjacent. Also, even though the pools are represented as single blocks, they may in fact be formed of one or more blocks of resources. As the skilled person will thus understand, these views are logical views which do not intend to accurately represent the physical distribution of the resources of each pool. For example, the three views of FIG. 8 may provide an accurate logical representation of a single example of D2D resources allocation. In other words, such representations do not imply that the actual physical time and frequency resources are allocated to the pools in a way that maps onto the representations of FIG. 8. The same principle applies to the illustrations of FIGS. 9 and 11-14.

By separating D2D resources for 1:1 communications from resources for 1:M communications, the risk of collisions between signals from the two different types of communications can thereby be reduced. As a result, the quality of service for 1:1 communications (which are more likely to be high reliability communications) can be improved. However, because the 1:1 resources pool is shared between all 1:1 D2D UEs, there is still a risk of collisions between D2D signals sent using the 1:1 resources pool.

Figure 9:
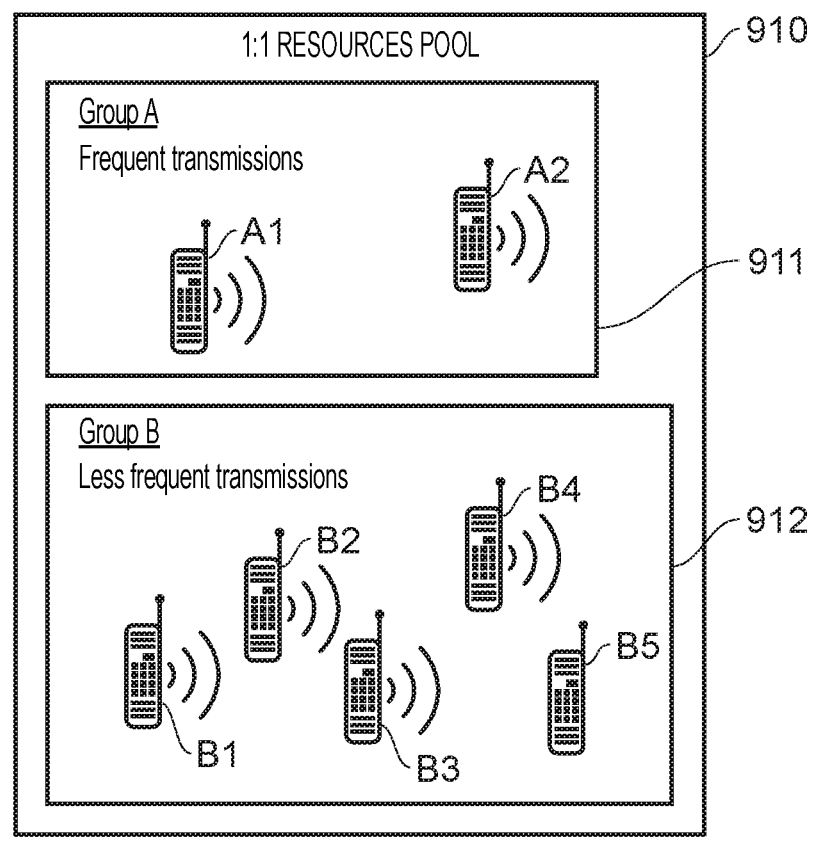
FIG. 9 provides an example of grouping within a resources pool in accordance with the present invention.

FIG. 9 provides an example of grouping within a resources pool in accordance with the present invention. This figure illustrates an example where resources from the 1:1 resources pool can be further allocated to one or more sub-groups with a view to improving the quality of service and/or to reducing the risk of collisions for 1:1 communications. In the specific example of FIG. 9, the 1:1 resources pool is divided into sub-groups: group A and group B. In this example, the preferred or most appropriate group for one UE is selected based on the expected type of transmissions from that UE. Group A is for UEs having frequent transmissions while group B is for UEs having less frequent transmissions. For example UEs in group A may be sending frequent but small messages while UEs in group B may be sending bigger messages but less frequently. Conventionally, these UEs would all be sharing the D2D resources. In accordance with the present disclosure, by separating these UEs from 1:M UEs, the level of service available to 1:1 D2D UEs can be improved and optionally, by separating 1:1 UEs depending on the size, number and/or frequency of expected communications for these UEs, this level of service can further be improved as discussed below.

In the example of FIG. 9, UEs A1 and A2 send frequent but small messages. In one example, such frequent but small messages can be keep-alive messages from idle UEs or periodical small update messages. A device may for example be expected to send a very brief message (e.g. "0") every minute to confirm that the device is still active and is functioning correctly. Such messages would not be critical and if one or more messages are lost due to collisions or interferences, a corrective action or monitoring alert would not necessarily occur. Still in the example of FIG. 9, UEs B1-B5 send fewer but bigger messages. For example, these messages can be longer messages (e.g. text and/or multimedia reports, images) but which are send less frequently and which require a higher reliability. In situation where UEs A1-A2 and B1-B5 where to share the same resources, the frequent but small messages from UEs A1 and A2 would like cause collisions with the traffic coming from UEs B1-B5. Also, due to the size of the messages to be sent by B1-B5, resending these messages would use a large amount of resources and would thus not be resource-efficient. On the other hand, by separating UEs A1-A2 from UEs B1-B5, the small but frequent messages would not collide with the messages from B1-B5 and therefore the communications from B1-B5 are more likely to be successful first time. In turn, the amount of resources needed for B1-B5 to send their messages would be reduced.

It is noteworthy that even though the expected level of reliability has been discussed above in respect of FIG. 9, it may not always be taken into account when deciding whether you really should be communicating with one group or another. For example, as mentioned above, by separating frequent transmissions from other transmissions, the risk of collisions associated with the frequent transmissions can be reduced, regardless of the frequent or non-frequent transmissions requiring a specific level of reliability, if any.

Additionally, in the example of FIG. 9 the 1:1 resources pool has been divided into two groups. However in other examples, the 1:1 resources pool may be divided into three or more groups based on any suitable criteria. For example it could be divided into a first group "group A" for frequent high reliability transmissions, a second group "group B" for frequent but low reliability transmissions and a third group "group C" for less frequent transmissions (e.g. regardless of any reliability level). Other criteria include for example a preferred or required QoS level, a preferred or required latency, . . . .

Preferably, in an arrangement where UEs are divided based on the frequency amount of traffic expected from them, a group should have fewer UEs if it is for frequent transmissions then a group for less frequent transmissions. For example, if too many UEs are associated with group A of FIG. 9, the collisions between the transmissions from the UEs could be such that the quality of service within that group would be drastically reduced. Likewise, it would be desirable for group B to include as many UEs as possible while preserving a certain level of service or quality of service. In some examples, the total size of the resources for each group or the related size of the resources for each group may be fixed or maybe changed when appropriate.

Also, if it is believed that a group comprises two many UEs for it to function in an optimal manner, this group may be subdivided into two groups if such a subdivision improves the quality of service and/or makes system more efficient. For example, it may be found at in some situations having a large amount of resources for or a group B comprising a large number of UEs is less efficient than having two groups having a small amount of resources and a smaller number of UEs. In this situation, the decision on which groups should be used for which communications is also based on a number of UEs within one or more of the groups. In other examples, this decision may additionally or alternatively be based on one or more further criteria, such as expected level of collision between communications from a group's UEs. In the example of FIG. 9, if the UEs in group A require a higher reliability than the UEs in group B, the UEs may be associated with one of group A or group B so that an expected level of collisions within group A is lower than the expected level of collisions within group B.

The decision on how to allocate resources to the groups within the 1:1 resources pool and/or on how to decide which group should be associated with a UE may be made by any suitable element. In one arrangement a network element, e.g. a eNodeB be, decides which resources are allocated to each group and decide on the criteria for identifying the most suitable group and communicate this information to the UEs. A UE may then decide to which group it should be associated based on the criteria received from the eNodeB and based on its own expected level of communication (e.g. frequency, size of messages, reliability, etc.). A UE may know the traffic load in the group/resource pool by performing interference measurements such as Reference Signal Receive Power (RSSI), Reference Signal Received Power (RSRP), and Reference Signal Received Quality (RSRQ). A UE may measure its own traffic activity/inactivity using, for example, the inactivity timer and/or buffer status. In another example arrangement, the UEs may already have stored a predetermined set of criteria for selecting a group and the UEs may be able to derive which of the 1:1 pool's resources are allocated to a group to be used from for example an identifier for that group.

Therefore, in accordance with the present disclosure, there is provided an arrangement where resources within the 1:1 resources pool can be allocated for use by one or more groups and/or sub-groups of 1:1 D2D UEs. The resources allocated to one of these groups and/or sub-groups may be referred to as a sub-pool as it provides a pool of resources within the 1:1 resources pool. It is also noted that a 1:1 resources pool divided into n separate groups may also be viewed or treated as n separate 1:1 resources pools. In other words, it is within the scope of the present disclosure that the plurality of 1:1 resources pools may be provided and the principles and teachings discussed herein in respect of groups within a single resources pool apply equally to a privately of resources pools.

Advantageously, and even though resources within a pool or sub-pool may be shared between two or more corresponding D2D UEs, by dividing the 1:1 UEs into two or more groups, some of the disadvantages and of the negative effects of resources sharing can thereby be reduced.

Resources Allocation—Dedicated Resources Pool

In the examples illustrated above, the reliability level provided to D2D terminals can be improved if required. However, because several UEs may be sharing resources within a pool and/or group, the risk of collisions may in some cases still be too high for the type of communications to be used. Some communications may require a very high level of reliability which may not be well suited for, or compatible with, the sharing of resources between UEs.

Figure 10:
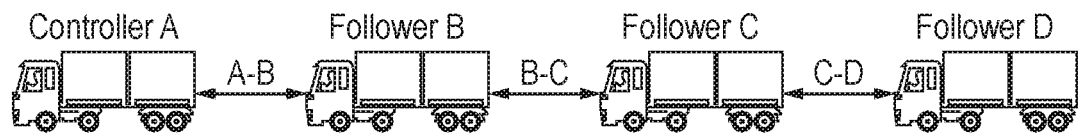
FIG. 10 provides an example use case for 1:1 D2D communications.

FIG. 10 provides an example use case for 1:1 D2D communications in a vehicle convoy environment. In this example, each of the vehicles A-D is provided with a mobile communications unit which is configured to communicate using at least D2D communications. For example the mobile communications unit may be a LTE unit which can be used in a conventional mode (communicating with a eNodeB) and in a D2D mode (communicating with other D2D devices). In this convoy the first vehicle controller A is the head of the convoy and communicates with at least the next vehicle follower B. In terms, follower B communicates with the next vehicle follower C which itself communicates with the next vehicle follower D. In this case, it is critical that the communications between A and B, B and C, and C and D do not suffer from a high level of collisions or a low quality of service. While some aspects of how to improve the overall quality of service may not be considered under the present disclosure, by reducing the level of collision for communications between the vehicles, the quality of service may be significantly improved which in turn contributes to the safety of the vehicles A-D. In the event that too many collisions occur, a message from one vehicle to a neighbouring vehicle may require several retransmissions which would delay the communications and may have disastrous consequences for the convoy. Accordingly, within a resources pool (or as a resources pool), there may be provided resources which are allocated to one UE only (e.g. for all communications from/to this UE or for all communications between this UE and another UE). Such resources may be allocated for one of, or any combination of, a first UE's transmitter, a first UE's receiver, a second UE's transmitter and a second UE's receiver. Cases where resources are allocated to one UE, transmitter or receiver only will sometimes be referred to as cases of dedicated resources allocation in the present disclosure.

Figure 11:
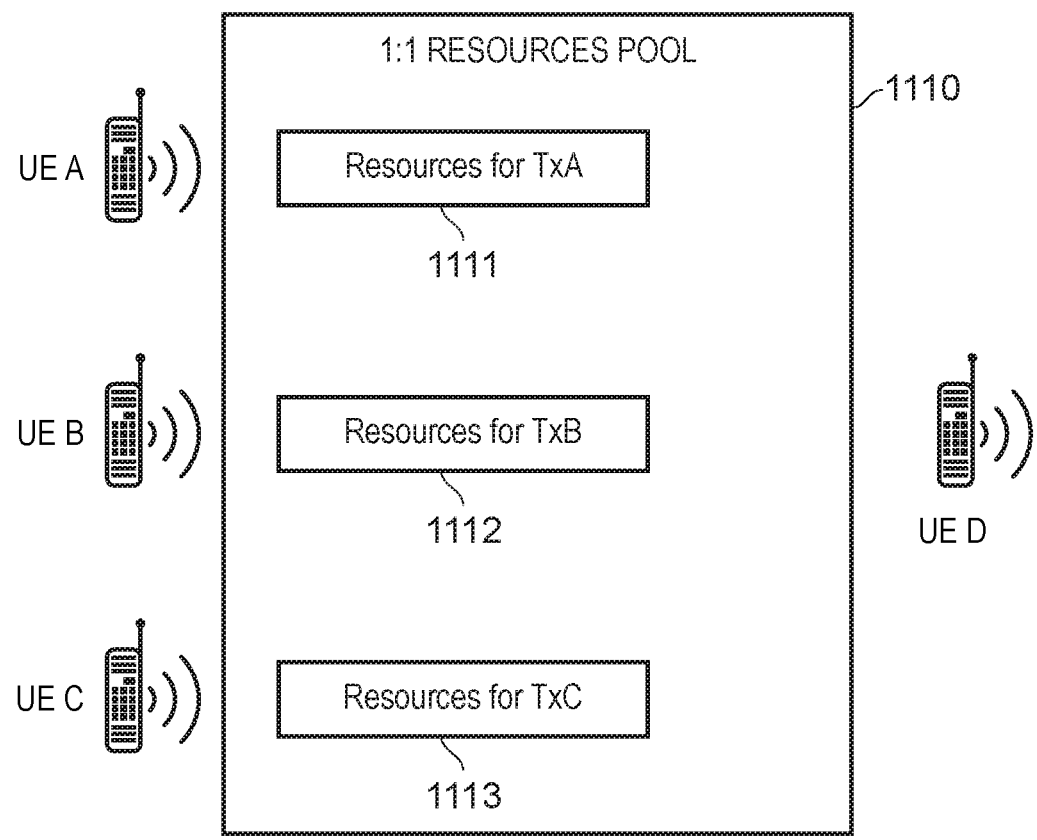
FIG. 11 provides an illustration of an example of dedicated resources allocations based on sources in accordance with the present disclosure.

FIG. 11 provides an illustration of an example of dedicated resources allocations based on sources in accordance with the present disclosure, where resources have been allocated to the transmitter of the three UEs A-C. This has been represented in FIG. 11 by the three boxes 1111, 1112 and 1113 within the 1:1 resources pool 1110. In this example, resources 1111 are reserved or dedicated for UE A to transmit signals while resources 1112 and 1113 are reserved or dedicated for UE B and C, respectively, to transmit signals. Accordingly signals transmitted by UEs A-C should not interfere with each other, i.e. should not collide, and should not interfere with any other signals from any other UE—for example UE D. As a result, the risk of collisions between the D2D UEs sharing the resources can be reduced and the level of reliability for UEs A-C can be improved. However as a result of the reserving or dedicating of the resources to individual UEs, their receiver and/or their transmitters, the resources may not be used as efficiently as previously because the dedicated resources should not be used by any other UEs even at times when the specific UE to which they are allocated is not using it dedicated resources to transmit signals. This is a trade-off to be taken into account when deciding how best to use the resources in the 1:1 resources pool(s): using dedicated resources can improve reliability while reducing the overall throughput and on the other hand, when two or more UEs share resources, the throughput may be increased but the risk of collisions would also increase (which can reduce reliability).

It is noteworthy that the examples (above or below) where resources are dedicated to one UE (or its receiver or transmitter) can be viewed as a possible use of the previously discussed groups. The "grouping"—as previously discussed—is in this case based on one of a UE, a UE's transmitter and a UE's receiver, with only a single one of them in the group and optionally paired with another UE (its receiver and/or transmitter). In other words, it can be viewed as a "grouping" as discussed above even though each group is limited to one element, where an element is a UE, a UE's transmitter, a UE's receiver, or any of these paired with another UE, another UE's transmitter or another UE's receiver. As a result, the teachings discussed in respect of the groups or resources pools above apply equally to any system, method or apparatus using dedicated resources.

Figure 12:
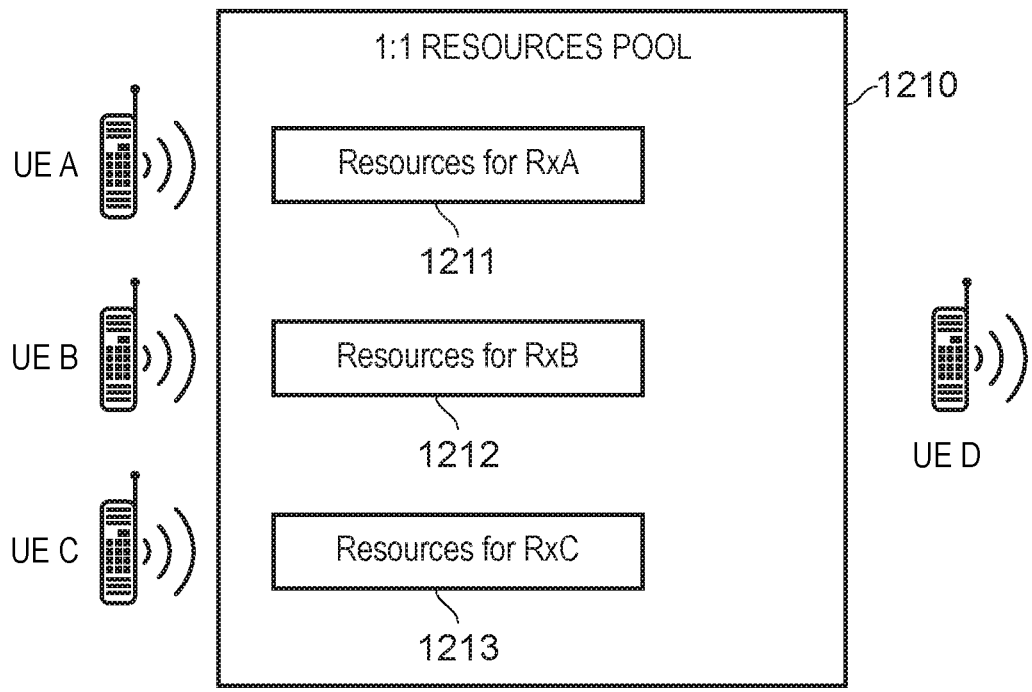
FIG. 12 provides another illustration of an example of dedicated resources allocations based on destinations in accordance with the present disclosure.

FIG. 12 provides another illustration of an example of dedicated resources allocations based on destinations in accordance with the present disclosure. In this second example of dedicated resources allocations, the resources in the 1:1 resources pool 1210 are allocated to a single receiver. In FIG. 12, three of the four UEs A-D have resources allocated for their receiver. UE A, UE B and UE C have resources 1211, 1212 and 1213, respectively, allocated from the 1:1 resources pool to their receivers. The resources 1211 can thus only be used for signals to be sent to the UE A. In some examples, these resources may thus be shared by a plurality of UEs which may communicate messages to UE A. In some examples, even though the resources may theoretically be used by a plurality of UEs, in practice they may only be used by one UE. For example, in the use case illustrated in FIG. 10, it is unlikely that a UE other than follower B would transmit messages intended for the receiver of controller A and therefore resources allocated to the receiver of UE A would not in practice be shared by two or more UEs. In other words in this case it may be sufficient to allocate resources for the receiver of UE A regardless of the UE transmitting signals to achieve the expected result.

In the present disclosure, when allocating resources to a single UE is discussed, this wording is intended to mean allocating resources for communications to and from the UE. Resources allocated to a single UE may thus be used for D2D 1:1 communications from this UE to any other D2D UE and for D2D 1:1 communications for this UE and from any other D2D UE. Likewise, resources can be allocated—or dedicated—to a single transmitter (for D2D 1:1 communications from this UE to any other D2D UE) or to a single receiver (for D2D 1:1 communications for this UE and from any other D2D UE)

Figure 13A:
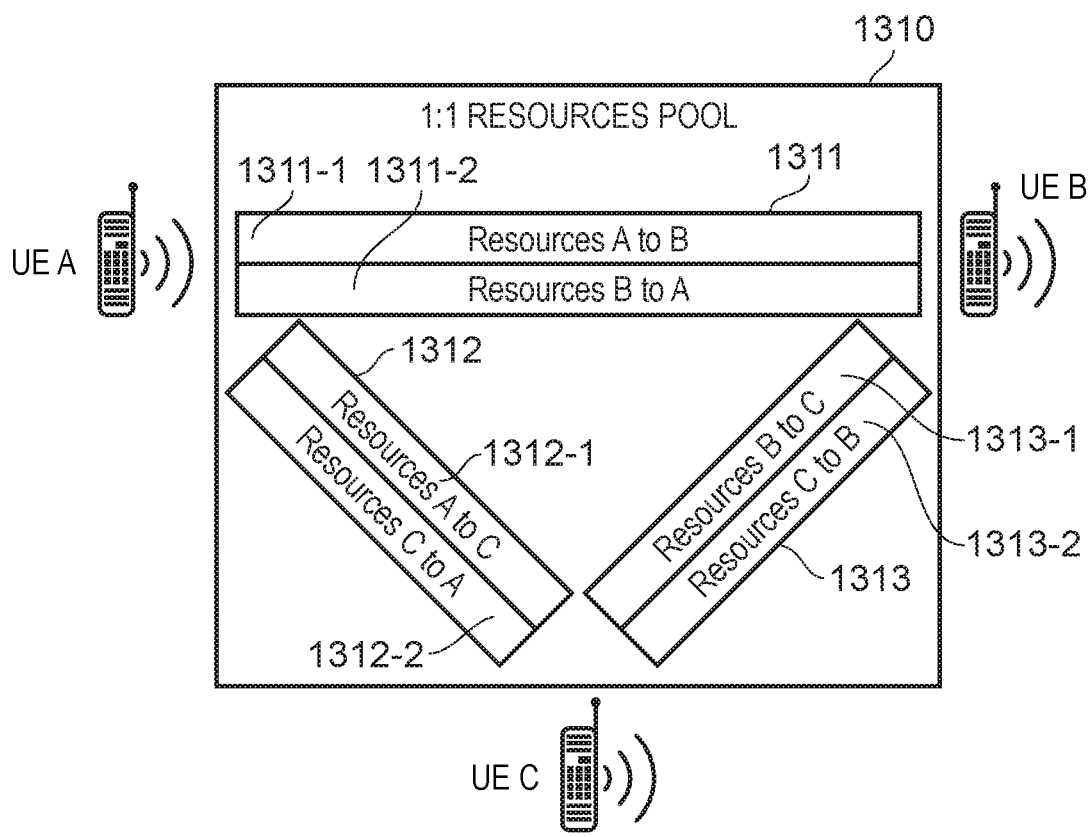
FIGS. 13A-13B provide an illustration of an example of dedicated resources allocations based on sources and destinations in accordance with the present disclosure.
Figure 13B:
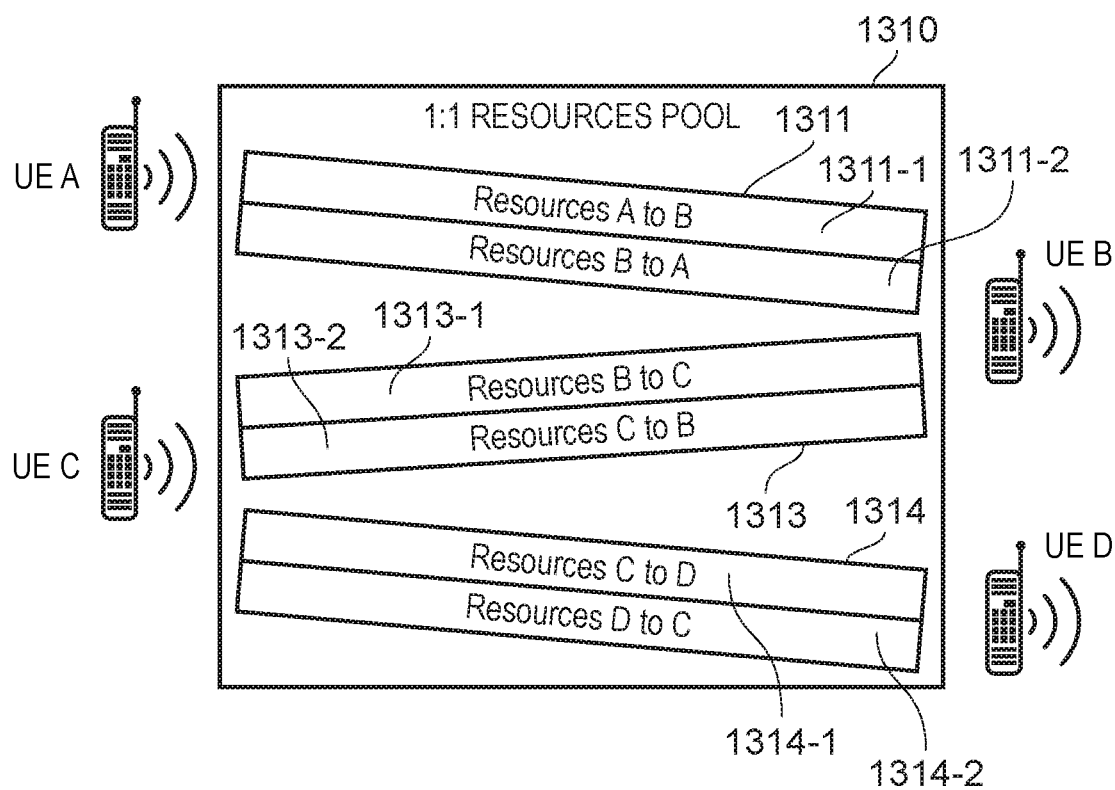

FIGS. 13A-13B provide an illustration of an example of dedicated resources allocations based on sources and destinations in accordance with the present disclosure. In the example of FIG. 13A, the 1:1 resources pool 1310 includes three sub-pools 1311, 1312 and 1313 for resources allocated to communications between UE A-UE B; UE A-UE C; and UE B-UE C, respectively. Within each sub pool, resources are allocated to further sub-pools and separately for communications from a first UE to the other UE and for communications from the other UE to the first UE. For example, resources 1311-1 are allocated for communications from A to B, resources 1311-2 are allocated for communications from B to A, resources 1312-1 are allocated for communications from A to C, resources 1312-2 are allocated for communication from C to A, resources 1313-1 are allocated to communications from B to C and resources 1313-2 are allocated to communications from C to B. In the previous sentence the term "allocated" can be read as "dedicated" within the meaning of the present disclosure as the resources are allocated exclusively to a pair of a UE's transmitter and another UE's receiver.

In the example of FIG. 13B, the resources 1310 of the 1:1 resources pool are allocated to three sub-pools 1311, 1313 and 1314 for the four UEs A-D. More specifically, resources within sub-pool 1311 are divided and allocated to communications from A to B (1311-1) and from B to A (1311-2), resources within sub-pool 1313 are divided and allocated to communications from B to C (1313-1) and C to B (1313-2) and resources within sub-pool 1314 are divided and allocated to communications from C to D (1314-1) and D to C (1314-2). The example of FIG. 13B may for example be suitable for use in the example situation of FIG. 10. In this example also illustrates that the dedicated resources may not be allocated to all possible combinations of UEs, UEs' receivers and/or UEs' transmitters. For example, the 1:1 resources pool 1310 of FIG. 13B does not include any resources allocated specifically for communications between UE A and UE C or D. In some cases, UE A may still communicate with UE C for example using shared resources (or non-dedicated resources) of the resources pool 1310. In other cases UE A may not be able to communicate with UE C for example because there are no remaining resources available for these communications, because UE A and UE C are too far apart to communicate with each other, etc.

In the arrangements of FIG. 13A-13B, the use of resources is likely to be less efficient than in an arrangement where the UEs share all of the resources of 1311, 1312, 1313 and/or 1314 in the single sub-pool, and in some cases significantly less efficient. However, in the event that any of the UEs wishes to send messages to another of the UEs, it should not experience any collisions from messages from the other UEs. In other words, the level of reliability that can be offered can thereby be improved. Therefore, depending on the requirements and possibly on a case-by-case basis, the resources may be allocated in a shared or dedicated manner so as to suit the situation as well as possible. Of course, the UEs could still experience collisions and/or interferences with messages or signals sent by other devices using the same resources, for example from devices using LTE (e.g. from another mobile network), Wi-Fi, Bluetooth or any other technologies. This is likely to be out of the control of the MNO, however by using dedicated resources the MNO can reduce collisions and interferences between messages from its UEs and thus improve the reliability of the message delivery in the 1:1 D2D protocol.

Figure 14:
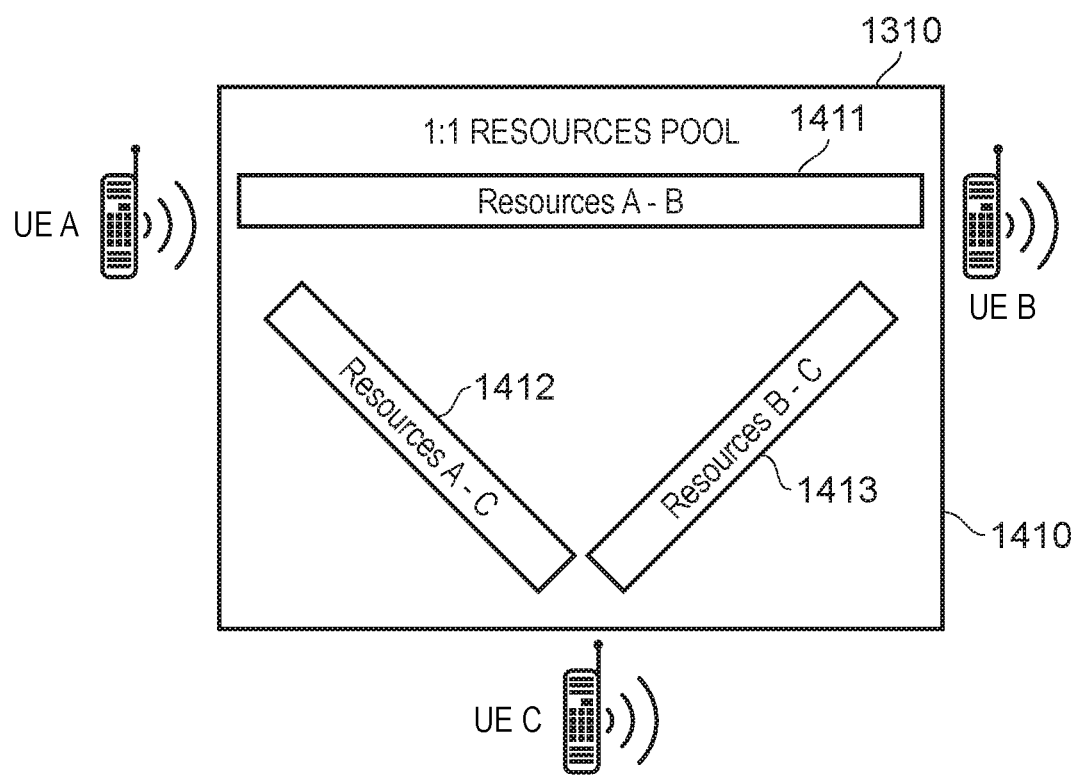
FIG. 14 provides an illustration of an example of dedicated resources allocations based on a source-destination pair.

FIG. 14 provides an illustration of an example of dedicated resources allocations based on a source-destination pair. In this example the 1:1 resources pool 1410 comprises three sub-pools 1411, 1412 and 1413. The first sub-pool 1411 is dedicated to communications between UEs A and B while the second and third sub-pools (1412 and 1413, respectively) are dedicated to communications between UEs A and C and UEs B and C, respectively. This example of resources allocations is somewhat similar to the example of FIG. 13A but where resources are not allocated specifically in one direction of communication between a pair of UEs. This arrangement may be sufficient to provide an acceptable level of reliability as each UE may be able to recover messages sent by the other UE and which collided with its own messages as it is aware of the details of its own messages which caused the collision. In other examples, even if no such recovery is attempted, depending on the type of communications between UEs A and B the risk of collisions between messages between the two UEs may not be significant enough to warrant an arrangement as illustrated in FIG. 13A. For example if most communications originate from UE A and the communications from UE B to a UE A consist mostly of acknowledgement messages, the amendment illustrated in FIG. 14 may be fully satisfactory. This situation can present itself if for example UE A is a home equipment device and UE B is a home devices monitoring centre. The home equipment device may send regular reporting messages (for example every hour) to the centre which acknowledges successful receipts of the reporting messages. The centre may communicate mostly with the remote server to send reports based on devices' reporting messages received on a regular basis (for example every day).

As will be understood by the skilled person, the various and illustrative examples discussed above may be adapted and/or combined in any suitable manner. For example, resources for some of the UEs may be shared, while other UEs have resources allocated specifically for their transmitter, while other UEs have resources allocated specifically for their receiver and another UE's transmitter, etc.

According to the present disclosure, there can therefore be provided an arrangement where the allocation of D2D resources can be improved so as to better suit the needs of 1:1 communications. As a result, devices using 1:1 communications may be segregated from devices using 1:M communications such that 1:M communications should not close collisions or interferences with 1:1 communications. Additionally (and optionally), the 1:1 resources may be further divided depending on the type of 1:1 communications (e.g. frequency of transmission, reliability preferences or requirements, latency preferences or requirements, device ID, service or type of service associated with the 1:1 communications, etc.). Therefore, a system which is originally designed for 1:M communications and not for 1:1 communications, can be improved so as to better accommodate 1:1 communications while limiting the impact on the conventional, existing and/or legacy (1:M) D2D communications system.

Depending on the situation, the extent to which the 1:1 resources are shared or not can be varied. For example, on one hand, the 1:1 resources pool may be shared amongst all D2D devices sending 1:1 communications. On the other hand, in other examples, the 1:1 resources may all be dedicated to a UE, a UE's receiver or a UE's transmitter (possibly paired with one of another UE, another UE's receiver or another UE's transmitter) and may thus not be shared between UEs. Of course, in some examples, the 1:1 resources may be allocated using an intermediate scheme or way of a resources allocation based on a combination of shared and dedicated resources.

In some cases the use of shared resources allocation may be preeminent. For example, it may be useful in cases with relatively infrequent transmissions such as one-off transmissions of a large volume of data. In these cases, if a high level of data loss is not acceptable, a conventional arrangement using resources shared with 1:M communications may not be appropriate due to the risk of collisions but sharing resources with 1:1 communications having for example the same profile can provide a satisfactory arrangement due to the low risk of collisions. From a more general point of view, using 1:1 shared resources has the advantage of providing an arrangement where resource utilisation is more efficient (compared to dedicated resources) thereby reducing the risk of a lack of resources. It also enables a reduction in the risk of collisions (compared to sharing resources with conventional D2D 1:M communications). However, even though this risk of collisions has been reduced, it is still present as the 1:1 resources are shared by devices for use for 1:1 communications. Therefore, this 1:1 shared resources scheme may be appropriate in cases where this lowered risk of collisions has been lowered enough to reach an acceptable level but there may be cases where this lowered risk may still remain too high to be satisfactory. As the skilled person will understand, collisions can affect the quality of the communications in the number of ways, such as by increasing latency, by decreasing throughput, by preventing successful communications altogether . . . .

In other cases, the use of dedicated resources allocation may be preeminent. For example it may be useful in cases where only a very low level of data loss is acceptable and where the risk of lacking resources may be relatively low. In these cases, even the improved (i.e. reduced) number of collisions provided by shared 1:1 resources discussed above may not be sufficient to attain a suitably low level of collisions. From a more general point of view, using 1:1 dedicated resources has the advantage of providing an amendment where resources are guaranteed and collisions with other D2D transmissions can be avoided altogether. As a result, transmissions delay and a number of errors can thereby be reduced and the quality of service provided can therefore be improved. On the other hand, dedicated resources allocation can provide an arrangement where resources utilisation is less efficient compared to shared 1:1 resources. This is because the resources are dedicated, i.e. allocated or reserved, to the relevant element(s) regardless of the element(s) actually transmitting signals are not. Also, depending on the number of elements to which resources are to be dedicated, the amount of resources dedicated for each element or pair of elements may be low. This is because the 1:1 resources to be allocated in a dedicated mode will have to be divided between the elements (or pairs of elements) and thus if many elements will have resources dedicated to them, they are likely to have a small amount of resources dedicated to them. As a result, the throughput available to each element may be very low. It may therefore not be suitable to use dedicated 1:1 resources for situations where there are a large number of UEs using 1:1 communications and/or where a large volume of data is to be transmitted. In this context, the term "element" refers to a UE, a UE's receiver or a UE's transmitter.

Therefore, it can be decided how best to allocate the resources in the 1:1 resources pool taking into account a number of elements such as: specific requirements, the type of D2D UEs, the type of communications to be sent using the D2D protocols, latency requirements, collision requirements, throughput requirements, etc. it is noteworthy that in the present sentence, the term "requirements" can also be read and interpreted as "preferences".

Resources Allocation—Allocating and/or Releasing Resources

The decision on how to best allocate resources using shared and or dedicated allocation schemes may be made by any appropriate unit for example an eNodeB or a UE. Also the unit responsible for deciding how to allocate the 1:1 resources of the resources pool may depend on the situation at hand. For example, in D2D in-coverage situations, an eNodeB may be considered as being an appropriate unit for making this decision while in a D2D without out-of-coverage situation, a UE may be considered as being appropriate unit for making decision.

As will be understood, in accordance with the present disclosure there are two types of resources allocations:

1. High-level allocations for allocations of D2D resources to 1:M and/or 1:1 resources pools and optionally, for allocations of D2D 1:1 resources within the 1:1 resources pool (for example using shared and/or dedicated resources allocation).

2. Low-level allocations for allocation of resources for actual UEs' transmissions. The resources to be used in a low-level allocation will of course depend on a high-level allocation. For example, resources allocated for a UE to transmit a 1:1 message would be selected from the 1:1 resources pool and not from the 1:M resources pool.

High-level and low-level allocation messages may be sent using any suitable method and may for example be sent using 1:M D2D resources. In some situations, the 1:M resources pool may always be available to UEs by default and the availability of the 1:1 resources pool(s) for UEs, if any, may be communicated via a broadcast message sent using the 1:M resources pool. For example, if it is detected that an existing 1:1 resources pool is becoming saturated while the 1:M resources pool is underused, it may be decided that resources previously in the 1:M resources pool may now be transferred to the 1:1 resources pool. The new 1:1/1:M resources pools configuration may then be communicated to UEs using a broadcasted message.

Once the 1:1 and 1:M resources pools configuration is known, resources within a 1:1 resources pool may be allocated in several possible ways.

In some situations, in particular are for some in-coverage cases, the resources within the 1:1 resources pool may be allocated by the eNodeB. When the UE enters the RRC connected state, the eNodeB may then allocate resources from the 1:1 resources pool for use by this UE.

In other cases, in particular for some out-of-coverage situations, one of the UEs may be acting as a cluster head (CH) and may allocate resources from the 1:1 resources pool. For example, when a UE enter the RRC connected state, the UE can request a one-to-one bearer connection and in response to this request the CH UE may allocate resources from the 1:1 resources pool to this UE.

In yet other cases, the resources may be allocated by the transmitting UE. For example, if a UE intends to send a 1:1 message, it may broadcast a resources allocation message using 1:M resources wherein the resources allocation message identifies resources from the 1:1 resources pool that the transmitting UE will be using for transmitting data.

In other examples, low-level allocation messages may not be required. For example, if as a result of the high-level allocations, a UE A has been allocated dedicated resources for communicating to UE B, UE A does not have to send a low-level allocation message and it may instead start communicating to UE B straightaway using the dedicated resources.

In further examples, the resources allocation may be pre-configured. Even though this example implementation may only be practical in a more limited number of situations, it could be beneficial to have pre-configured UEs which are aware of the high-level or low-level resources allocations. This may be particularly useful in situations where the number of UEs is small. For example, the position of the 1:1 resources pool may vary depending on a cell or available resources while the relative position of the resources to be used by a specific UE may be maintained relative to the pointer to the 1:1 resources pool's position. For example, once a UE is aware of the position of the 1:1 resources pool, the UE can automatically determine or derive the resources to use to communicate based on the location of the 1:1 resources pool. Advantageously (and as in the previous case), allocation messages and procedures may not be required and the system can be simplified.

In some example, the resource mapping for pre-configuration cases can be implemented using at least a hash function and/or any other suitable function. The hash function may use any suitable input, such as for example any one of or combination of
 (i) an ID for the source UE (e.g. Prose ID, IMSI, etc.);
 (ii) an ID for the destination UE (e.g. Prose ID, IMSI, etc.);
 (iii) additional input (e.g. start position of resource pool, cell id(PCI), data size, transmit/receive type, time information, etc.)

The output of the hash function may help determine a resource index indicating unique resources. For example the resource index may indicate the following information, or the following information may be derived from the index: frequency position (resource block, resource element), time (symbol, slot, and subframe), space (antenna), code (orthogonal code number), etc.

In examples where low-level allocation is taking place, the allocation may be carried out in different ways. For example, they may be allocated on demand, when a communication starts or is about to start, and the resources may be allocated for this communication only. In a first implementation, the on-demand allocation may be carried out in a semi-static manner. In this case, when the UE is in a RRC connected state, the resources are allocated to a UE until the communication is completed. In some cases, the communication being completed may coincide with the RRC connection being torn down and the resources may be allocated until the RRC connection is released. In a second implementation, the UE may carry out a UE autonomous allocation. In this case, the UE selects resources for the communication and informs the other UEs (e.g. using a 1:M broadcasted message) of the resources it will be using. Other UEs may then avoid using these resources with a view to reducing collisions. In a third implementation, the resources may be allocated in a dynamic way. This case is similar to the semi-static but the resources are not allocated for a specific session or communication. To try to avoid blocking resources for too long, a timer is then provided to determine for how long the resources will remain allocated to this UE. Once the time expires, the resources are released. In the event that the UE has completed its communications, no further steps are required but in the event that the UE has not completed its communications, it may have to have more resources allocated for its transmissions. As a result, one or more further (low-level) allocation messages may be exchanged.

Figure 15:
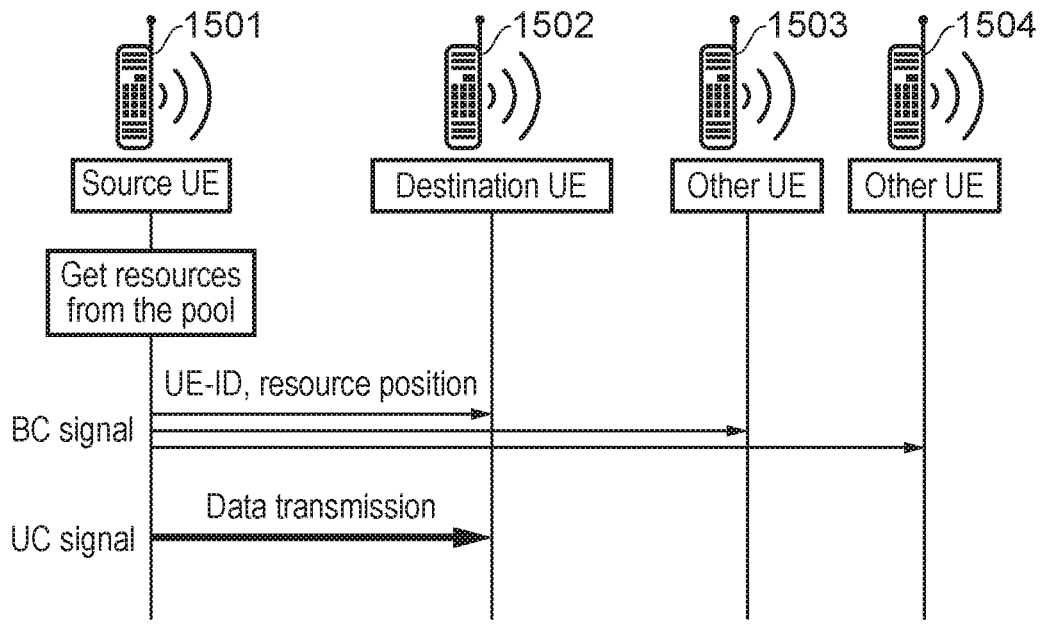
FIG. 15 provides an illustration of an example of resources allocations controlled by a terminal in accordance with the present disclosure.
Figure 16:
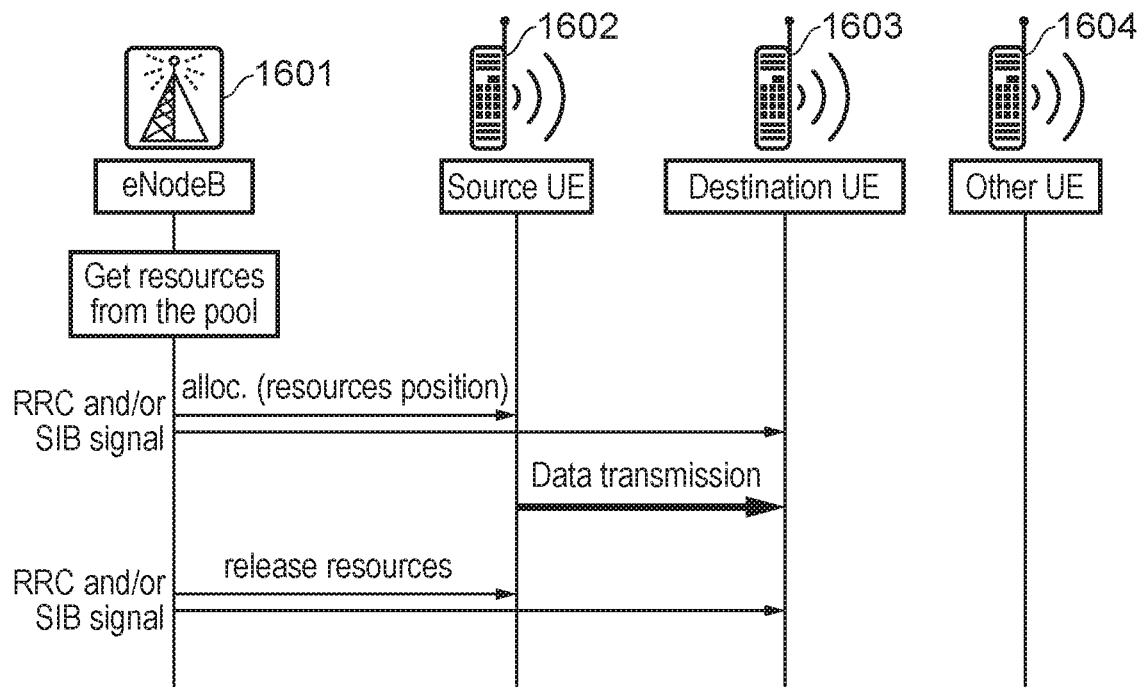
FIG. 16 provides an illustration of an example of resources allocations controlled by a base station in accordance with the present disclosure.
Figure 17:
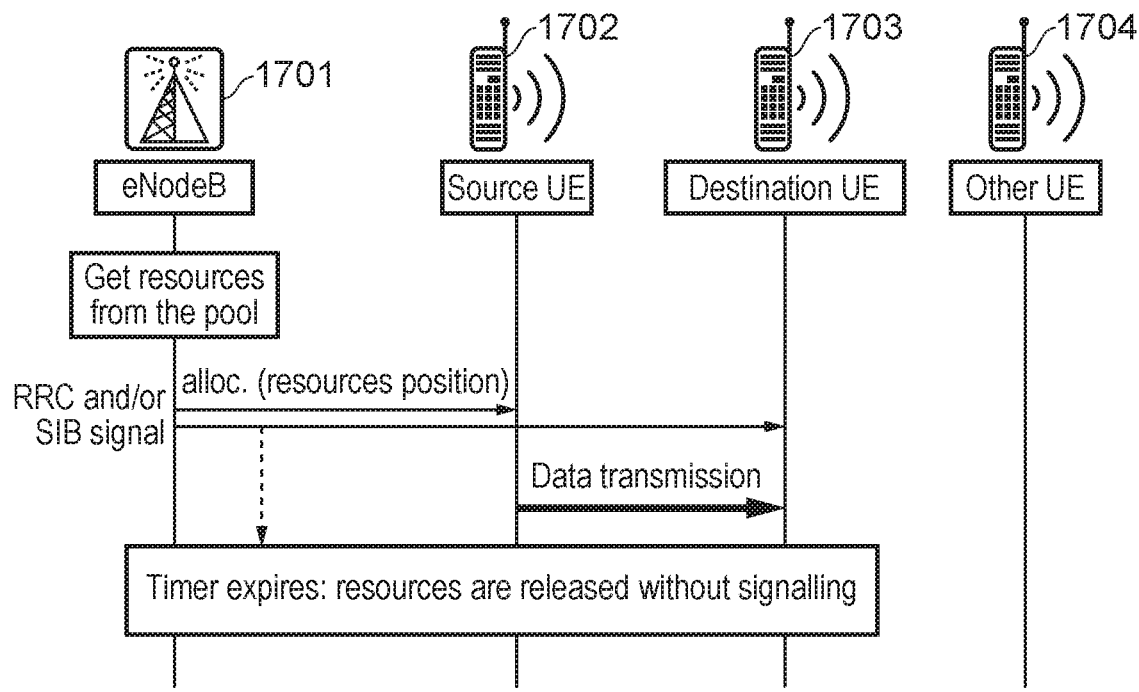
FIG. 17 provides another illustration of another example of resources allocations controlled by a base station in accordance with the present disclosure.

FIGS. 15-17 provides illustrations of examples of possible implementations of (low-level) resources allocation. FIG. 15 provides an illustration of an example of resources allocations controlled by a terminal in accordance with the present disclosure. The illustration of FIG. 15 corresponds to a case where the UE is responsible for the low-level allocation of resources (i.e. the allocation of resources within the 1:1 resources pool). This can correspond for example to the second implementation discussed above. The UE 1501 first autonomously allocates resources from shared resources of the 1:1 resources pool. Because at least part of the 1:1 resources pool is shared between these four UEs, the source UE 1501 then broadcasts ("BC") a signal informing the other UEs 1502, 1503 and 1504 of the resources allocation. The allocation message may for example include an ID for the UE and information relating to the resources position so that other UE can try to avoid using the same resources. Then, the source UE 1501 can start transmitting its data to the destination UE 1502 using the allocated resources from the 1:1 resources pool.

FIG. 16 provides an illustration of an example of resources allocations controlled by a base station in accordance with the present disclosure. This illustration can correspond for example to the first implementation discussed above. In this case, a eNodeB 1601 decides which resources to allocate to the source UE 1602 for its communications to the destination UE 1603. The eNodeB 1601 can then inform the source and destination UEs of the allocated resources. The allocation message will include information relating to the position or location of the allocated resources and may also include an ID of the source UE 1602 and possibly of the destination UE 1603. As in this case the UEs will wait for an allocation message before they start communicating and thus do not operate in an autonomous manner as illustrated in FIG. 16, the allocation message may be sent to the source and destination UEs only. The allocation message may therefore be sent in a unicast—not broadcast—manner. In the example of FIG. 16, the allocation message is sent using RRC and/or SIB signalling, where "SIB" stands for System Information Blocks. Thus, in the illustration of FIG. 16, the allocation message is not sent to UE 1604 which is not involved in the communication. Once the resources have been allocated and the allocation has been communicated to the source and destination UEs, the source UE 1602 can start transmitting data to the destination UE 1603. Once the transmission is completed, the resources can be released. Preferably the resources will be released using signalling which mirrors the signalling for the allocation message. As for the resources allocation messages, the resources release message may be sent to the source and destination UEs only, not to other UEs (as illustrated in FIG. 16).

FIG. 17 provides another illustration of another example of resources allocations controlled by a base station in accordance with the present disclosure. This example is similar to the semi-static implementation as it illustrates a dynamic resources allocation (see the discussion of the third implementation above). The first steps are similar to the first steps of FIG. 16 with eNodeB 1701 and UEs 1702-1704 acting in a similar manner to eNodeB 1601 and UEs 1602-1604, respectively, of FIG. 16. Once the allocation messages have been sent, the source UE 1702 can start transmitting data to the destination UE 1703 via the allocated resources indicated in the allocation message. A timer is also set up which determines when the resources allocation will expire. For example the timer may be pre-set or may be indicated in the allocation message. Once the timer expires, the resources are automatically released and, by using this timer arrangement, the releasing of data can be performed without signalling or messaging to that effect.

Figure 18:
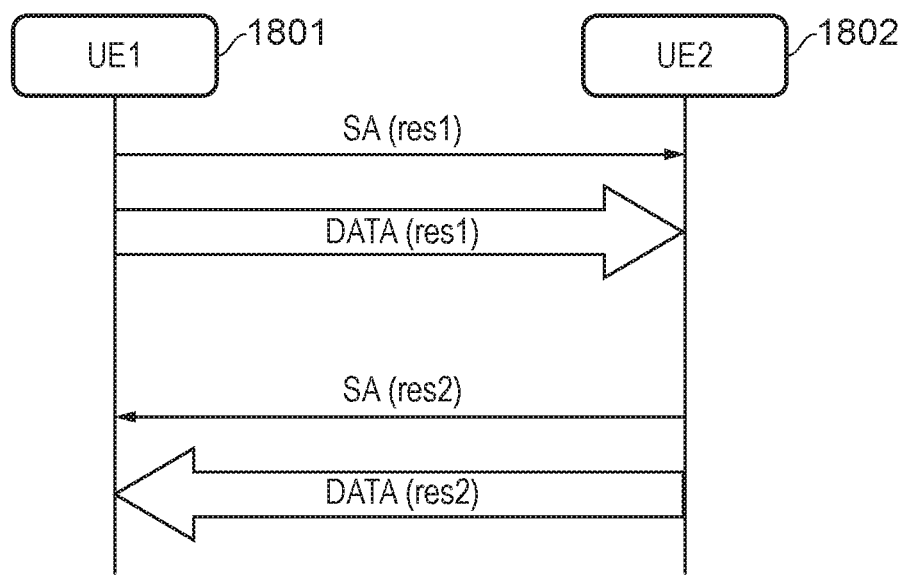
FIG. 18 provides an illustration of an example of a resources allocation and data two-way exchange in accordance with the present disclosure.
Figure 19:
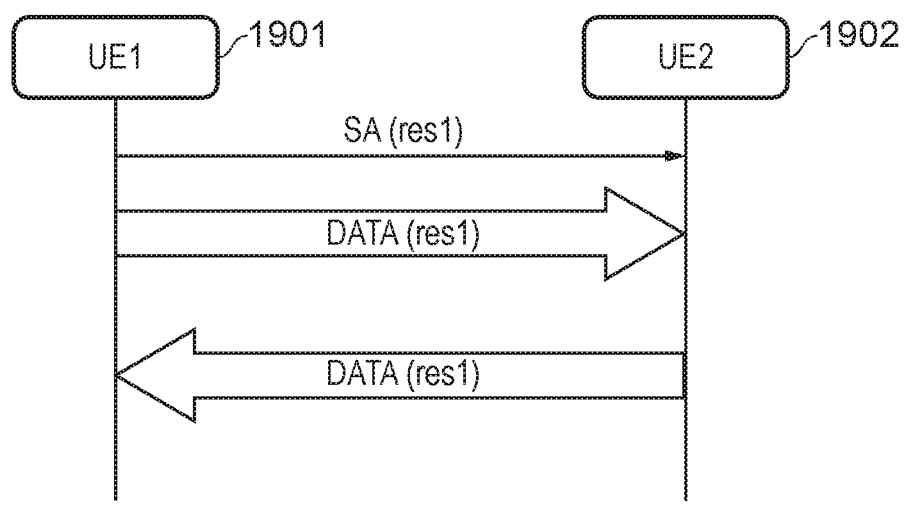
FIG. 19 provides an illustration of another example of a resources allocation and data two-way exchange in accordance with the present disclosure.

In the examples of FIGS. 15-17, the resources are allocated for a transmission from a source to a destination, i.e. in one direction only. Therefore, if the destination wishes to communicate data back to the first UE (e.g. to send an ACK, to respond to a query, etc.), resources have to be allocated for the transmission in the opposite direction. This is shown for example in FIG. 18 which illustrates an example of a resources allocation and data two-way exchange. In this example, UE1 1801 first sends data to UE2 1802 which then sends data back to UE1. It is pointed out that the illustrations of FIG. 18-19 are simplified illustration and, for example, the allocation messages may not actually be sent by UE1 to UE2. As the skilled person will understand from the teachings of the present disclosure (see for example the discussion of FIGS. 15-17), the allocation messages may be sent by another party and/or may be broadcasted rather than sent specifically to UE2. As illustrated in FIG. 18, allocation messages (identified as "SA" standing for "Scheduling Assignment") are sent first to indicate the resources res1 and res2 allocated for the first communication and the second return communication, respectively. Once the allocation messages have been received, the UEs can start transmitting data via the allocated resources res1 and res2.

FIG. 19 provides an illustration of another example of a resources allocation and data two-way exchange in accordance with the present disclosure. This other example may be used as an alternative to the arrangement of FIG. 18. In this example, resources are allocated for a two-way communication and, therefore, a single allocation message may be used for informing the UE1 and/or UE2 of the resources allocated for messages sent to each other. The UE1 1901 can then send its data to UE2 using the allocated resources res1 and, if the UE2 wishes to send any data in return, it can do so using the same allocated resources res1. This can be particularly useful when the return communication from UE2 to UE1 is relatively short because the amount of signalling to be send may be significant in comparison to the corresponding amount of data. For example, if the return data is merely an acknowledgement that the transmission has been received, the overhead created by the resources allocation signalling can become significant and therefore undesirable.

Resources Allocation—Possible Variations and Other Aspects

Even though 1:1 and 1:M communication have been generally presented separately above, it is within the teachings of the present disclosure that one device may be configured to use both 1:1 resources and 1:M resources. Both types of resources may be used simultaneously or not. Therefore, references to a 1:1 UE should be understood at a UE using 1:1 communications (i.e. a UE which may also be using 1:M communication before, simultaneously to or after 1:1 communication).

As mentioned above, dedicated resources can be viewed (1) as a sub-pool of the 1:1 resources pool or (2) as resources outside the 1:1 resources pool wherein the pool terminology is then used only for resources whish are shared.

High reliability and high reliability communications can refer or relate to one or more of the following elements:
  low error rate, error recovery, connection persistence, etc.
  guaranteed QoS (stable, throughput/error rate ratio requirements, etc.)
  Low latency (minimum delay, real-time requirements, etc.)
  High priority data These aspects may for example be considered when deciding whether and how resources within the 1:1 resources pool should be grouped into sub-pools (for sharing) and/or dedicated to elements (for a dedicated resources allocation mode), or for deciding whether to use a 1:1 resources pool or not altogether.

Also, depending on the amount of traffic, the traffic quality, a number of D2D UE, etc., the resources pool may be expanded or reduced. In some examples, the D2D system provides by default a conventional arrangement, i.e. where resources are used in a way which is particularly suited to 1:M communications. If it is detected that 1:1 traffic is to be sent, some of the resources may be separated from the rest of the resources and reserved for 1:1 communications by creating a 1:1 resources pool. If it is then detected that a low level of or no 1:1 communications are expected, the 1:1 resources pool may no longer be in use and the corresponding resources may be return for use on the conventional way. In other words, once D2D UEs start communicating using 1:1 D2D communication, a larger resource pool may be required in order to reduce collision probability, in particular with 1:M communication, and it can thus be beneficial to use a 1:1 resources pool. Likewise, depending on the level of 1:1 traffic, the size of the 1:1 resources pool can be adjusted while maintaining the 1:1 resources pool.

Possible triggers for a resource pool's size adjustment include:
  Entering RRC connected state with a request for a 1:1 communication in a case where the eNodeB controls resource pool.
  the number of 1:1 D2D (e.g. "ProSe") communication users at the core network level
  a high number of detected collision of Layer1/Scheduling assignments It is pointed out that, in the present disclosure, the term party may refer to one or more terminal device or network element.

Also the terms user equipment (UE), communications terminal, terminal, terminal device and communications device may be used interchangeably.

Further aspects of the present disclosure are described in the following numbered clauses:

Clause 1. A method of allocating resources for communications in a mobile telecommunication system wherein the mobile telecommunication system provides a wireless interface for a base station to communicate with communications devices and wherein a communications device is operable to transmit signals to another communications device using resources of the wireless interface and in accordance with a device-to-device communication protocol, wherein a first pool of the resources is allocated to device-to-device communications of the broadcast type and a second pool of the resources is allocated to a device-to-device communications of the unicast type, the second pool of resources being separate from the first pool,
  the method comprising:
  a first communications device transmitting broadcast messages using resources of the first resources pool; and a second communications device transmitting unicast messages using resources of the second resources pool.

Clause 2. A method according to any preceding clause, the method further comprising:

transmitting a message to one or more communications devices, the message comprising a pool location indication wherein the position of the first resources pool and the position of the second resources pool can be derived from the pool location indication.

Clause 3. A method according to any preceding clause, wherein the second resources pool is divided into at least a first sub-pool and a second sub-pool, wherein the sub-pools are separate from the each other, the method comprising:

when preparing for transmitting signals using the second resources pool, the second communications device selecting one of the at least first and second sub-pools to use for sending the signals; and the second communications device transmitting the signals using resources of the selected sub-pool.

Clause 4. A method according to clause 3, wherein the method comprises:

determining that the second resources pool should be divided into at least a first sub-pool and a second sub-pool;

upon said determination, transmitting a message to a communications device, the message comprising a sub-pool location indication wherein the position of the first sub-pool and the position of the second sub-pool can be derived from the sub-pool location indication.

Clause 5. A method according to clause 4, wherein the message further comprises an indication of one or more sub-pool selection criteria for use by communications devices to select a sub-pool for transmitting signals.

Clause 6. A method according to any of clauses 4 to 5, wherein said determination is based on an estimated or measured level of collision within the second resources pool.

Clause 7. A method according to any of clauses 4 to 6, wherein said determination is based on an estimated or measured level of traffic load within the second resources pool.

Clause 8. A method according to clause 7, wherein said traffic load level is estimated or measured based on an interference indicator for the second resources pool.

Clause 9. A method according to any of clauses 4 to 8, wherein said determination is based on an estimated or measured level of transmission activity/inactivity in the UE.

Clause 10. A method according to clause 9, wherein said inactivity level is estimated or measured based on a timer for measuring non-transmission duration in the UE.

Clause 11. A method of any of clauses 3 to 10, wherein an indication of one or more sub-pool selection criteria for use by the second communications device to select a sub-pool for transmitting signals is stored in the second communications device.

Clause 12. A method of clause 11, wherein the one or more sub-pool selection criteria comprise one or a combination of: a reliability level parameter, a communication type, a Quality of Service "QoS" parameter, a latency parameter, a priority parameter, a throughput parameter, and a maximum number of communications devices in the sub-pool.

Clause 13. A method of any of clauses 3 to 12, the method further comprising:

determining that the level of collision in one of the sub-pool is unacceptable based on a comparison with a sub-pool acceptability threshold;

upon determining that the level of collision in one of the sub-pool is unacceptable, re-allocating the resources of the second pool between the corresponding sub-pools.

Clause 14. A method of any preceding clause further comprising:

determining that the level of collision in the second resources pool is unacceptable based on a comparison with a pool acceptability threshold;

upon determining that the level of collision in the second resources pool is unacceptable, re-allocating the resources between the first and second pool.

Clause 15. A method of any preceding clause further comprising:

allocating resources in the second resources pool for communications in respect of a specific communications device.

Clause 16. A method of clause 16, wherein the resources in the second resources pool to be allocated to communications in respect of the specific communications device are selected based on one or a combination of: a reliability level parameter, a communication type, a Quality of Service "QoS" parameter, a latency parameter, a priority parameter and a throughput parameter.

Clause 17. A method of any preceding clause further comprising the second communications device:

transmitting a first message as a broadcast message using resources of the first resources pool, transmitting a second message as a unicast message using resources of the second resources pool, wherein the first message comprises resources allocation information for indicating resources of the second resources pool used for transmitting the second message.

Clause 18. A method of any preceding clause further comprising:

allocating two-way resources for communications between the second communications device and a third communications device;

the second communications device transmitting signals to the third communications device using the allocated two-way resources; and in response to the transmitted signals received from the second communications device, the third communications device transmitting signals to the second communications device using the allocated two-way resources.

Clause 19. A mobile telecommunication system for device-to-device communication, the mobile telecommunication system comprising a base station; and communications devices, wherein the mobile telecommunication system provides a wireless interface for the base station to communicate with the communications devices;

one of the communications devices is operable to transmit signals to another one of the communications devices using resources of the wireless interface and in accordance with a device-to-device communication protocol, wherein a first pool of the resources is allocated to device-to-device communications of the broadcast type and a second pool of the resources is allocated to a device-to-device communications of the unicast type, the second pool of resources being separate from the first pool a first of the communications devices is configured to transmit broadcast messages using resources of the first resources pool; and a second of the communications devices is configured to transmit unicast messages using resources of the second resources pool.

Clause 20. A mobile telecommunication system according to clause 19, the system further comprising:

an element configured to transmit a message to one or more communications device, the message comprising a pool location indication wherein the position of the first resources pool and the position of the second resources pool can be derived from the pool location indication wherein, optionally, the element is one of a base station and a communications device.

Clause 21. A mobile telecommunication system according to clause 19 or 20, wherein the second resources pool is divided into at least a first sub-pool and a second sub-pool, wherein the sub-pools are separate from the each other, wherein the second communications device is configured to, when preparing for transmitting signals using the second resources pool, select one of the at least first and second sub-pools to use for sending the signals; and to transmit the signals using resources of the selected sub-pool.

Clause 22. A mobile telecommunication system according to clause 21, wherein the system comprises:

an element configured to determine that the second resources pool should be divided into at least a first sub-pool and a second sub-pool, wherein the element is configured to, upon said determination, transmit a message to a communications device, the message comprising a sub-pool location indication wherein the position of the first sub-pool and the position of the second sub-pool can be derived from the sub-pool location indication, wherein, optionally, the element is one of a base station and a communications device.

Clause 23. A mobile telecommunication system according to clause 22, wherein the message further comprises an indication of one or more sub-pool selection criteria for use by communications devices to select a sub-pool for transmitting signals.

Clause 24. A mobile telecommunication system according to any of clauses 22 to 23, wherein said element is configured to make the determination based on an estimated or measured level of collision within the second resources pool.

Clause 25. A mobile telecommunication system of any of clauses 21 to 24, wherein an indication of one or more sub-pool selection criteria for use by the second communications device to select a sub-pool for transmitting signals is stored in the second communications device.

Clause 26. A mobile telecommunication system of clause 24 or 25, wherein the one or more sub-pool selection criteria comprise one or a combination of: a reliability level parameter, a communication type, a Quality of Service "QoS" parameter, a latency parameter, a priority parameter, a throughput parameter, and a maximum number of communications devices in the sub-pool.

Clause 27. A mobile telecommunication system of any of clauses 21 to 26, the system further comprising:

an element configured to determine that the level of collision in one of the sub-pool is unacceptable based on a comparison with a sub-pool acceptability threshold;

wherein the element is configured to, upon determining that the level of collision in one of the sub-pool is unacceptable, re-allocate the resources of the second pool between each of the corresponding sub-pools; and wherein, optionally, the element is one of a base station and a communications device.

Clause 28. A mobile telecommunication system of any of clauses 19 to 27, the system further comprising:

an element configured to determine that the level of collision in the second resources pool is unacceptable based on a comparison with a pool acceptability threshold;

wherein the element is configured to, upon determining that the level of collision in the second resources pool is unacceptable, re-allocate the resources between the first and second pools; and wherein, optionally, the element is one of a base station and a communications device.

Clause 29. A communications device for device-to-device communication, wherein the communication device is configured to operate in a mobile telecommunication system, the mobile telecommunication system providing a wireless interface for a base station to communicate with communications devices, wherein the communications device is operable to transmit signals to another communications device using resources of the wireless interface and in accordance with a device-to-device communication protocol;

wherein the communications device being operable to transmit signals in accordance with a device-to-device communication protocol comprises the communications device being operable to transmit broadcast messages using resources of a first pool of resources; and the communications device being operable to transmit unicast messages using resources of a second pool of resources, the second pool of resources being separate from the first pool of resources.

REFERENCES

[1] R2-133840, "CSMA/CA based resource selection," Samsung, published at 3GPP TSG-RAN WG2 #84, San Francisco, USA, 11-15 Nov. 2013.

[2] R2-133990, "Network control for Public Safety D2D Communications", Orange, Huawei, HiSilicon, Telecom Italia, published at 3GPP TSG-RAN WG2 #84, San Francisco, USA, 11-15 Nov. 2013.

[3] R2-134246, "The Synchronizing Central Node for Out of Coverage D2D Communication", General Dynamics Broadband UK, published at 3GPP TSG-RAN WG2 #84, San Francisco, USA, 11-15 Nov. 2013.

[4] R2-134426, "Medium Access for D2D communication", LG Electronics Inc, published at 3GPP TSG-RAN WG2 #84, San Francisco, USA, 11-15 Nov. 2013.

[5] R2-134238, "D2D Scheduling Procedure", Ericsson, published at 3GPP TSG-RAN WG2 #84, San Francisco, USA, 11-15 Nov. 2013.

[6] R2-134248, "Possible mechanisms for resource selection in connectionless D2D voice communication", General Dynamics Broadband UK, published at 3GPP TSG-RAN WG2 #84, San Francisco, USA, 11-15 Nov. 2013.

[7] R2-134431, "Simulation results for D2D voice services using connectionless approach", General Dynamics Broadband UK, published at 3GPP TSG-RAN WG2 #84, San Francisco, USA, 11-15 Nov. 2013.

[8] "D2D Resource Allocation under the Control of BS", Xiaogang R. et al, University of Electronic Science and Technology of China, https://mentor.ieee.org/802.16/den/13/16-13-0123-02-000n-d2d-resource-allocation-under-the-control-of-bs.docx

[9] US20130170387

[10] US20120300662

[11] LTE for UMTS: OFDMA and SC-FDMA Based Radio Access, Harris Holma and Antti Toskala, Wiley 2009, ISBN 978-0-470-99401-6.

The invention claimed is:

1. A communications device configured to communicate with another communications device using resources of a wireless interface provided by a wireless communications network in accordance with a device-to-device (D2D) communication protocol, the communications device comprising:
    circuitry configured to
        select resources from a plurality of pools of resources for transmitting D2D messages; and
        transmit D2D broadcast messages and D2D unicast messages using the selected resources.

2. The communications device of claim 1, wherein the circuitry is configured to receive, from the wireless communications network, a message comprising an indication of positions of the plurality of pools of resources.

3. The communications device of claim 1, wherein the plurality of pools of resources comprise a pool of resources that is divided into at least a first sub-pool and a second sub-pool, the first sub-pool and the second sub-pool being separate from each other.

4. The communications device of claim 3, wherein the circuitry is configured to select resources from one of the at least first sub-pool and the second sub-pool for transmitting the unicast messages.

5. The communications device of claim 3, wherein the circuitry is configured to receive a message from the wireless communications network indicating a position of the first sub-pool and a position of the second sub-pool.

6. The communications device of claim 5, wherein the message further comprises an indication of one or more sub-pool selection criteria for use by communications devices to select a sub-pool for transmitting signals.

7. The communications device of claim 1, wherein the plurality of pools of resources comprise:
    a first pool of resources that corresponds to at least a first frequency subcarrier, and
    a second pool of resources that corresponds to at least a second frequency subcarrier.

8. The communications device of claim 7, wherein the first frequency subcarrier is different from the second frequency subcarrier.

9. The communications device of claim 1, wherein the plurality of pools of resources comprise:
    a first pool of resources that corresponds to a first plurality of frequency subcarriers, and
    a second pool of resources that corresponds to a second plurality of frequency subcarriers.

10. The communications device of claim 9, wherein the first plurality of frequency subcarriers is different from the second plurality of frequency subcarriers.

11. The communications device of claim 1, wherein the plurality of pools of resources comprise:
    a first pool of resources that corresponds at least a first group of resource blocks, and
    a second pool of resources that corresponds to a second group of resource blocks.

12. The communications device of claim 11, wherein the first group of resource blocks is different from the second group of resource blocks.

13. The communications device of claim 1, wherein the circuitry is configured to:
    receive D2D broadcast messages and D2D unicast messages transmitted from another communications device in resources included in the plurality of pools of resources.

14. A user equipment configured to communicate with another communications device using resources of a wireless interface provided by a wireless communications network in accordance with a device-to-device (D2D) communication protocol, the user equipment comprising:
    circuitry configured to
        receive, from the wireless communications network, a message identifying a plurality of pools of resources for transmitting D2D messages;
        select resources from the plurality of pools of resources; and
        transmit D2D broadcast messages and D2d unicast messages using the selected resources.

15. The user equipment of claim 14, wherein the plurality of pools of resources comprise:
    a first pool of resources that corresponds to at least a first frequency subcarrier, and
    a second pool of resources that corresponds to at least a second frequency subcarrier.

16. The user equipment of claim 14, wherein the plurality of pools of resources comprise:
    a first pool of resources that corresponds to a first plurality of frequency subcarriers, and
    a second pool of resources that corresponds to a second plurality of frequency subcarriers.

17. The user equipment of claim 14, wherein the plurality of pools of resources comprise:
    a first pool of resources that corresponds to a first plurality of system resource blocks, and
    a second pool of resources that corresponds to a second plurality of system resource blocks.

18. Circuitry configured for use in a user equipment configured to communicate with another communications device using resources of a wireless interface provided by a wireless communications network in accordance with a device-to-device (D2D) communication protocol, the circuitry configured to:
    receive, from the wireless communications network, a message identifying a plurality of resources for transmitting D2D messages; and
    transmit D2D broadcast messages and D2D unicast messages using resources selected from the plurality of resources.

19. The circuitry of claim 18, wherein the plurality of pools of resources comprise:
    a first pool of resources that corresponds to at least a first frequency subcarrier, and
    a second pool of resources that corresponds to at least a second frequency subcarrier.

20. The circuitry of claim 18, wherein the plurality of resources comprise:
    first resources that correspond to a first plurality of system resource blocks, and
    second resources that correspond to a second plurality of system resource blocks.

* * * * *